US009795004B2

(12) United States Patent
Blum et al.

(10) Patent No.: US 9,795,004 B2
(45) Date of Patent: *Oct. 17, 2017

(54) LEARNING CAPABLE LIGHTING EQUIPMENT

(71) Applicant: ABL IP HOLDING LLC, Conyers, GA (US)

(72) Inventors: Darren Blum, San Mateo, CA (US); Januk Aggarwal, Tysons Corner, VA (US); Aaron Engel-Hall, San Francisco, CA (US); John England, San Francisco, CA (US); Min-Hao Michael Lu, Castro Valley, CA (US)

(73) Assignee: ABL IP HOLDING LLC, Conyers, GA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/252,397

(22) Filed: Apr. 14, 2014

(65) Prior Publication Data

US 2015/0296594 A1  Oct. 15, 2015

(51) Int. Cl.
*H05B 33/08* (2006.01)
*H05B 37/02* (2006.01)

(52) U.S. Cl.
CPC ....... *H05B 37/0227* (2013.01); *H05B 33/086* (2013.01); *H05B 33/0863* (2013.01); *H05B 37/0218* (2013.01); *H05B 37/0236* (2013.01); *Y02B 20/46* (2013.01)

(58) Field of Classification Search
CPC ............ H05B 37/0227; H05B 37/0245; H05B 37/02; H05B 33/0857; H05B 33/0842; H05B 37/029; G05B 15/02; G05B 19/042; G06K 9/00369

USPC ....... 315/295–297, 152, 151, 307, 312, 158; 340/5.8; 700/19; 715/744; 706/21; 362/276

See application file for complete search history.

(56) References Cited

U.S. PATENT DOCUMENTS 9,137,878 B2   9/2015 Thompson
9,344,572 B1 *  5/2016 Castiglione, III .. H04M 3/5183
(Continued)

FOREIGN PATENT DOCUMENTS

NL   WO 2010079388 A1 *  7/2010  ......... H05B 37/0245
WO   WO 2010/079388    *  7/2010  ............. H05B 37/02

OTHER PUBLICATIONS

Ian F. c. Smith Intelligent Computing in Engineering and Architecture: 13th EG-ICE Workshop 2006, Ascona, Switzerland, Jun. 25-30, 2006, p. 279.*

*Primary Examiner* — Alexander H Taningco
*Assistant Examiner* — Renan Luque
(74) *Attorney, Agent, or Firm* — RatnerPrestia

(57) ABSTRACT

A lighting device or system is configured to control of one or more parameters of light output, such as ON/OFF status, intensity when ON, color characteristics and position or orientation of light output (e.g. via a motorized luminaire control). The device or system may have other output capability, e.g. display projection or audio. Sensors or other input devices are responsive to the user. Responsive to user input, sensed activity, and/or acquired information, the device or system, controls a light source in accordance with a lighting control function. Operation of the light source and the lighting control function may be modified based on learning by the device or system.

11 Claims, 13 Drawing Sheets

(56) References Cited

U.S. PATENT DOCUMENTS

| | | | |
|---|---|---|---|
| 2006/0170376 A1* | 8/2006 | Piepgras | E06B 3/6722 315/295 |
| 2006/0195225 A1* | 8/2006 | Aoki | G06Q 90/00 700/245 |
| 2009/0085500 A1* | 4/2009 | Zampini, II | H05B 33/0857 315/297 |
| 2013/0134902 A1* | 5/2013 | Mahale | H05B 37/0227 315/297 |
| 2013/0293115 A1* | 11/2013 | De Groot | H05B 37/0227 315/152 |
| 2014/0175875 A1* | 6/2014 | Newman, Jr. | H04L 69/18 307/18 |
| 2014/0267412 A1* | 9/2014 | Calian | G09G 5/377 345/633 |

* cited by examiner

LEARNING CAPABLE LIGHTING EQUIPMENT

TECHNICAL FIELD

The present subject matter relates to techniques and equipment to provide an interactive user interface for lighting purposes and the ability to learn from user interaction, for example, to operate the lighting based on a user's profile and adjust the lighting based on physical and/or on-line activity of the user.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

However, there have also been proposals to further enhance lighting controls. For example, it has been proposed that a lighting device may include a sensor and processing capability to detect gestural inputs from a user. If the sensor detects touch, the user must approach the device or an associated control panel and contact the touch sensor in an appropriate manner to input a gesture corresponding to the user's desired control of the light. More recent developments in gestural sensing technologies eliminate the need for actual touching, but such devices still typically require that the user make the appropriate gesture in fairly close proximity to the sensor on the device or at the control panel.

There have also been efforts to develop speech-command responsive control of lighting, using advanced speech recognition technologies.

In a somewhat related field a variety of entities are proposing controls for lighting and other functions in a building from a variety of portable user devices, for example, from remote controls or from mobile devices such as smartphones or tablet computers.

Despite such recent efforts, there is still room for further improvement in the user interface with a lighting system and/or in the functions that a lighting system may offer through its user interface as well as the ability to learn and adjust a lighting system based on past and current user interaction.

SUMMARY

A first example of a system described in detail below includes a source of light, a sensor, a data communication interface, a storage device and a processor. In the system example, the source of light outputs visible light responsive to control by the processor, and the data communication interface is controlled by the processor. The sensor is configured to detect a condition in a space illuminated by the system related to an activity of an occupant of the space and the sensor provides a condition responsive input to the processor.

The storage device in the first system example contains a program that, when executed by the processor, configures the system to identify the occupant, retrieve a profile of the identified occupant including a lighting control function and operate the light source in accordance with the lighting control function while the occupant is in the space. Execution of the program by the processor also configures the system to access information about the identified occupant from an on-line service to determine an on-line status and to process the condition responsive input to determine an activity of the occupant in the space. Based on the on-line status and/or activity status, execution of the program by the processor adjusts the operation of the light source.

Another example of a system described in detail below includes a source of light, a sensor, a data communication interface, a storage device and a processor. In this system example, the source of light outputs visible light responsive to control by the processor, and the data communication interface is controlled by the processor. The sensor is configured to detect a condition in a space illuminated by the system related to an activity of at least one of a plurality of occupants of the space and the sensor provides a condition responsive input to the processor.

The storage device in this system example contains a program that, when executed by the processor, configures the system to identify at least one of the plurality of occupants and, for each of the identified occupants, retrieve a profile of the identified occupant including a lighting control function and operate the light source in accordance with the lighting control function while the identified occupant is in the space. Execution of the program by the processor also configures the system to access information about each identified occupant from an on-line service to determine an on-line status and process the condition responsive input to determine an activity of each identified occupant in the space. Based on the on-line status and/or activity status of each identified occupant, execution of the program by the processor adjusts the operation of the light source. In this example, operation and adjustment of the light source for each identified occupant contributes to a composite operation and a composite adjustment of the light source in accordance with a composite lighting control function.

Still another example of a system described in detail below includes a source of light, a sensor, a storage device and a processor. In this system example, the source of light outputs visible light responsive to control by the processor. The sensor is configured to detect a condition in a space illuminated by the system related to an activity of at least one of a plurality of occupants of the space and the sensor provides a condition responsive input to the processor. This system also includes a user input element for providing user input for processing to the processor.

The storage device in this system example contains a program that, when executed by the processor, configures the system to identify the occupant and operate the light source in accordance with a predetermined lighting control function while the occupant is in the space. Execution of the program by the processor also configures the system to receive input from at least one of the user input element representing a desired change of the visible light output and the sensor representing an activity status of the identified occupant. In response to the received input, the predetermined lighting control function is modified and the modified lighting control function is stored as a profile established for the identified occupant. While the identified occupant remains in the space, the light source is operated in accordance with the modified lighting control function of the profile.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
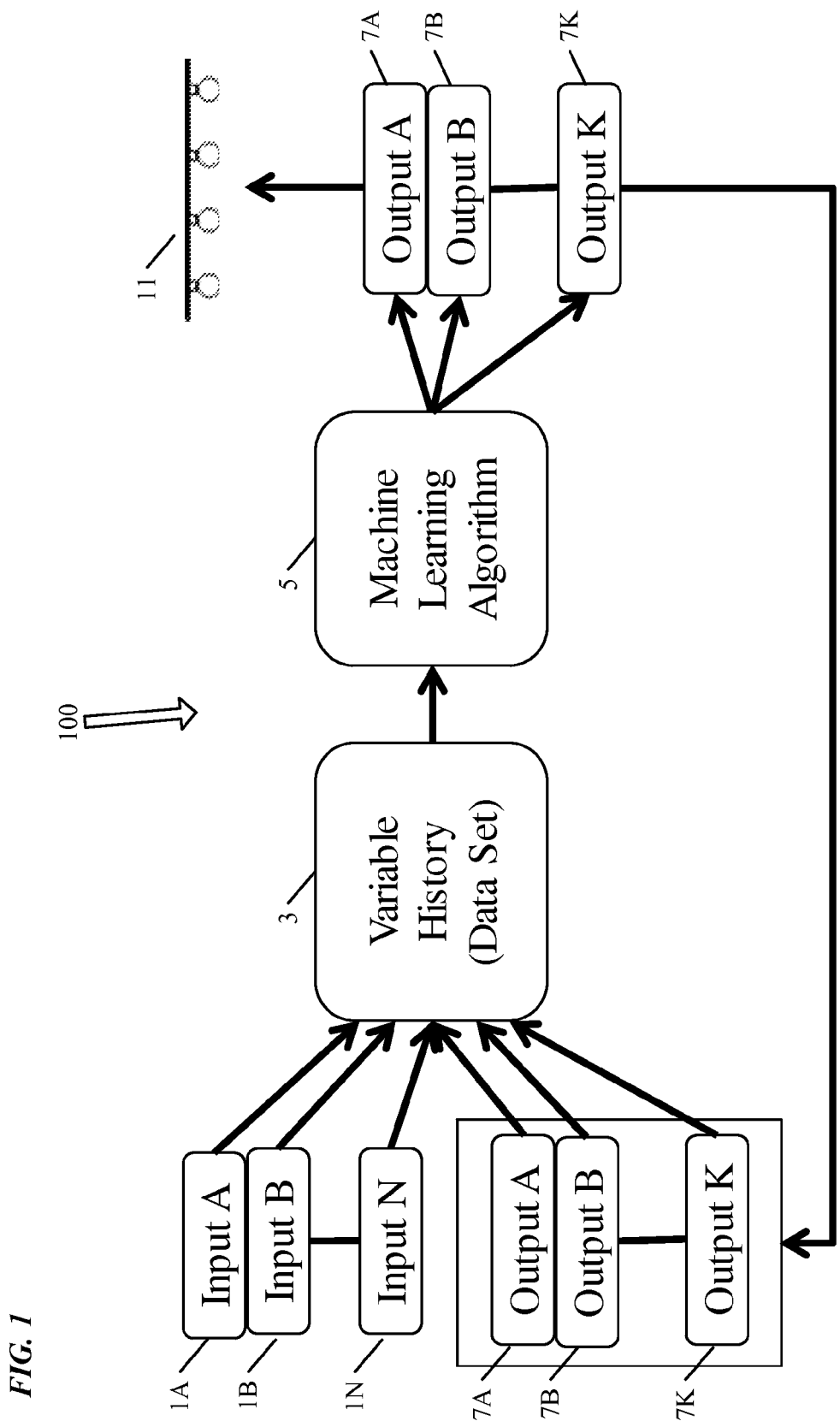
FIG. 1 is a simple example of a learning system with lighting control based on a range of inputs, including a range of previous outputs, historical data and a machine learning algorithm.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As lighting devices incorporate more intelligence, people are beginning to add more functionality, such as more sophisticated user interactivity. The world is becoming interconnected. The trend in technologies that control lighting is toward an "Internet of things" in which more and more machines are interconnected to communicate with each other and interact with the users via the Internet. However, there are many diverse ways to access the Internet, for example, with a computer via wired or fiber network (even with a WiFi local link) or with a mobile device (e.g. smartphone or tablet) via any of the various available public and private wireless networks.

For lighting, the lighting devices and controllers and possibly some central control element (e.g. a server) may communicate with each other via a network. The user in turn communicates with such a system via the Internet using one of these common access techniques instead of or in addition to interaction via system elements (e.g., a control panel, sensor, etc.) in the illuminated space. So, the user often now is coming in from another network that may be separate from the networking used for communications of the lighting system elements. The user also has their own device, albeit of their choosing, but separate and in addition to the elements of the lighting system. Such user access may be part of the problem. For example, use of other access technologies adds to the complexity of the system; and the integration of the lighting network with other user devices, may entail use of separate user device programming in addition to special programming in the lighting system, and/or may increase overall costs. In some cases, the additional devices and/or their software may not be adequately adapted to the lighting system and its operations.

To improve the user experience and provide a more effective or more efficient user interface, the various examples of a lighting system discussed below and shown in the drawings offer an interactive user interface implemented with the input and/or output components and associated processing functionality in one or more of the lighting devices. Stated another way, the lighting devices may themselves implement some or all of the interactive user interface to the lighting system, and the user interacts with the lighting system via the lighting devices.

Furthermore, the various examples of a lighting system discussed below and shown in the drawings offer responsive lighting conditions based on user activity and user conditions. That is, not only does the lighting system respond to an interactive user interface, but the lighting system also responds to other conditions both sensed from within a space occupied by the user as well as acquired from outside of the space, thus learning from these other conditions. Over time, some of these learned inputs may be used to adjust future lighting or other controlled conditions.

Reference now is made in detail to the examples illustrated in the accompanying drawings and discussed below.

FIG. 1 illustrates a simple example of a learning system 100 that may be used to control a lighting function of an adjustable lighting device 11, such as one or more fixtures, lamps or other types of luminaires described in greater detail below. The learning system 100 receives various inputs 1A, 1B . . . 1N, including previously generated outputs 7A, 7B . . . 7K and generates the current outputs 7A, 7B . . . 7K. These various inputs include, for example, user selectable options (i.e., direct user input), sensed conditions (e.g., indirect user input based on user activity, other non-user activity, or other conditions such as time of day, temperature, weather conditions, etc.). Inputs may also include information obtained via external network communications, such as user inputs via a remote device or status or the like about a user occupant obtained from an on-line service. The outputs correspond to, for example, a variety of light output parameters, such as ON/OFF, intensity (when ON) and various color-related characteristics, which may change or vary the output of lighting device 11 in response to a control signal or command from the system 100.

The learning system 100 includes a variable history 3, commonly referred to as a data set. The variable history (data set) 3 includes not only the currently received various inputs 1A, 1B, 1N and outputs 7A, 7B . . . 7K, but also all previously received inputs and outputs. For personalized control, the data set becomes part of or is linked to a profile of a particular user who may occupy the space from time to time.

This variable history (data set) 3 is provided to a machine learning algorithm 5 which in turn generates the outputs 7A, 7B . . . 7K. The machine learning algorithm 5 is, for example, a neural network that "learns" how to manipulate the various inputs, including previously generated outputs, in order to generate current outputs. As part of this "learning" process, the neural network calculates weights to be associated with the various inputs, including the previously generated outputs. The weights are then utilized by the neural network to manipulate the inputs, including the previously generated outputs, and generate the current outputs. Although FIG. 1 illustrates a simple example of the learning system 100, such learning system 100 may be more or less complex, including any number of inputs and outputs with a variable history (data set) 3 that may be filtered or otherwise controlled and any number of different learning algorithms 5. Hardware for receiving the inputs, storing the data set and running the learning algorithm to control the lighting device will be discussed later.

Figure 2:
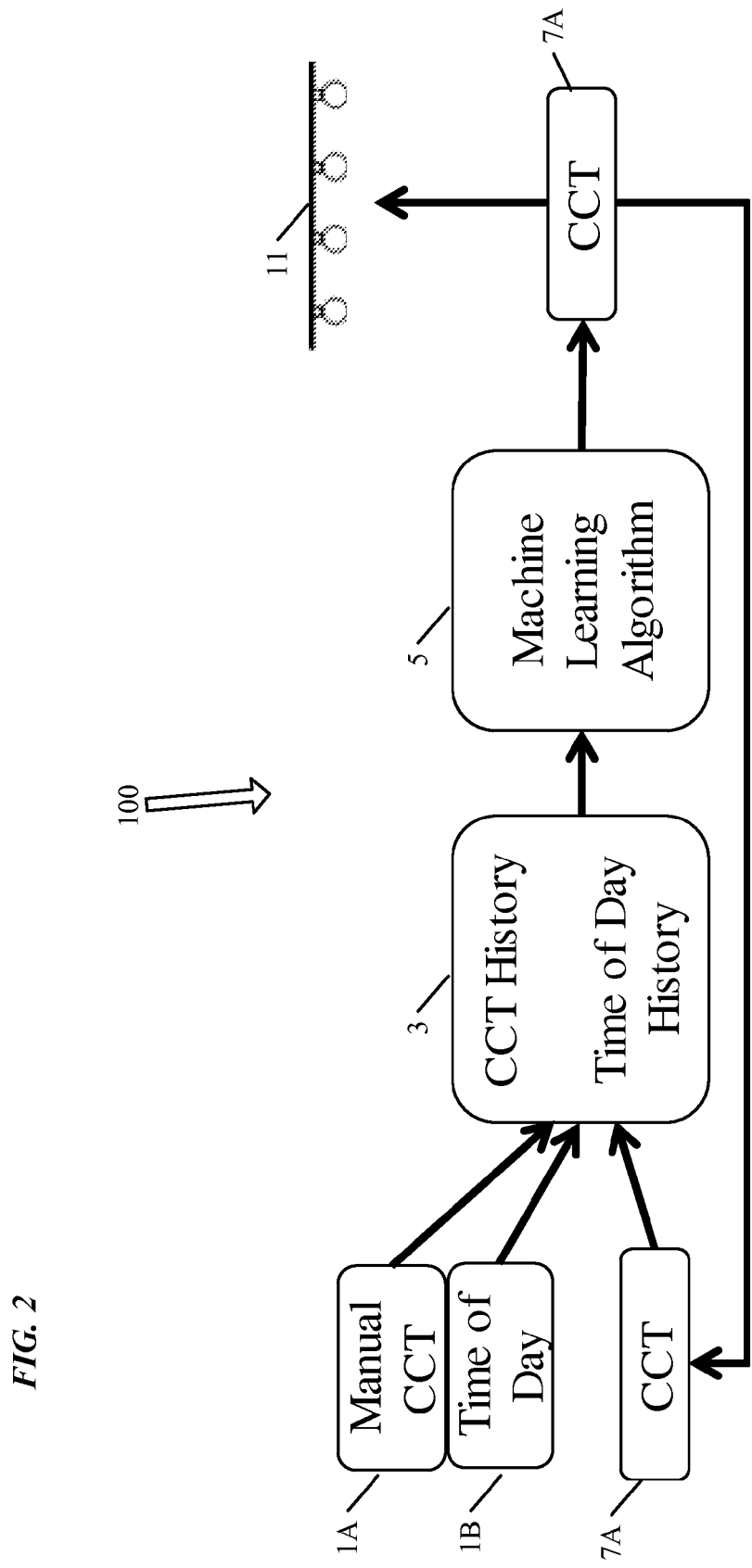
FIG. 2 is another example of the learning system of FIG. 1 with three inputs, including a previous output, historical data and a machine learning algorithm where the output controls a lighting function.

For simplicity, FIG. 2 is an example of the learning system 100 of FIG. 1 with three inputs (two inputs and a previous output) that generates one output. Although a variety of light output parameters may be controlled, the example of lighting device 11 in the discussions below is controlled to adjust the correlated color temperature (CCT) of the light output. In this example, input 1A is a manual user adjustment of the CCT of adjustable lighting device 11. The color temperature of a lamp or other light source is the temperature of an ideal black body radiator that radiates light of comparable hue to that of the lamp or other light source. Color temperature is conventionally stated in Kelvin (K). CCT is the color temperature of a black body radiator which to human color perception most closely matches the light from the lamp or other light source. Thus, in this example, the user is attempting to change the CCT of adjustable lighting device 11. Input 1B is the time of day corresponding to the manual user adjustment. The output 7A is the CCT that will be applied to adjustable lighting device 11.

In the example of FIG. 2, the data set 3 includes all previous manual user adjustments of CCT as well as the time of day corresponding to each manual user adjustment. The machine learning algorithm 5 takes the data set 3 and generates a current CCT value 7A to be applied to adjustable lighting device 11. In this way, the learning system 100 "learns" from current and previous manual CCT adjustments by the user such that the learning system 100, for example, anticipates future CCT adjustments. Stated another way, learning system 100 may automatically adjust the CCT of adjustable lighting device 11 based on a current time of day in light of previous similar CCT adjustments made by the user. As such, the CCT of adjustable lighting device 11 is, for example, adjusted to meet a user's needs and desires without requiring any user intervention to effect the change.

Figure 3:
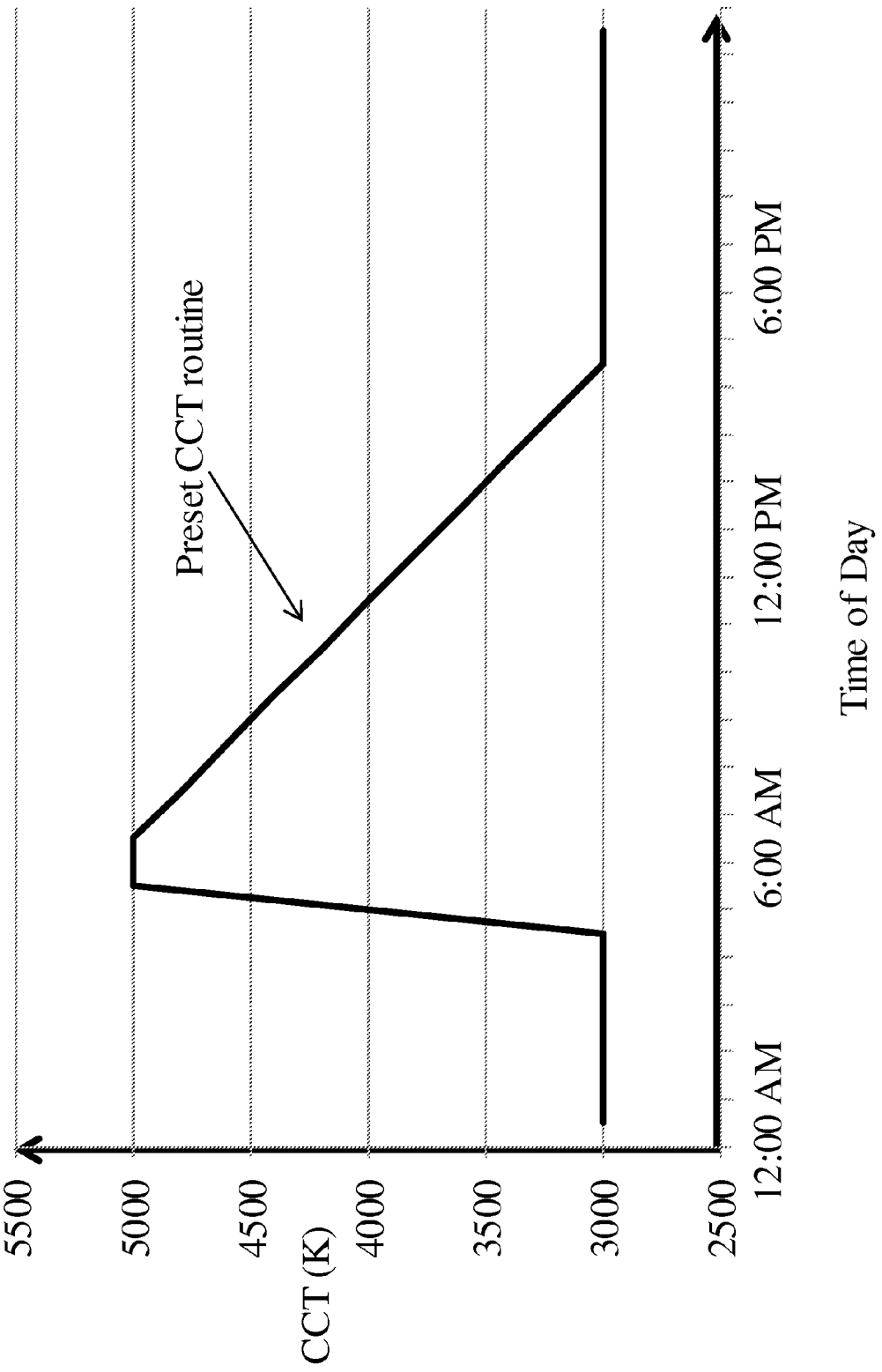
FIG. 3 is a graph depicting an example of a preset lighting control function.

FIG. 3 illustrates a graph of a preset lighting control function, in this example, related to the CCT of a light source (e.g., adjustable lighting device 11) whenever ON during a 24-hour cycle. In this graph, the x axis represents the CCT level, in K, and the y axis represents the time of day, in hourly increments. The preset lighting control function, for example, adjusts the CCT or color temperature of a lighting device, such as adjustable lighting device 11. As depicted in the graph, the preset lighting control function sets the CCT to 5,000 K, a cool white, at approximately 5:00 AM. Then, throughout the day, the preset lighting control function adjusts the CCT until it reaches 3,000 K, a warm white, at approximately 4:30 PM. The preset lighting control function maintains the CCT at 3,000 K until approximately 5:00 AM the next morning, when the cycle repeats itself. In this way, the preset lighting control function, for example, replicates variations in color characteristics of daylight throughout the daytime working hours of each day and a steady selected CCT (e.g., 3,000 K) at other times.

Figure 4:
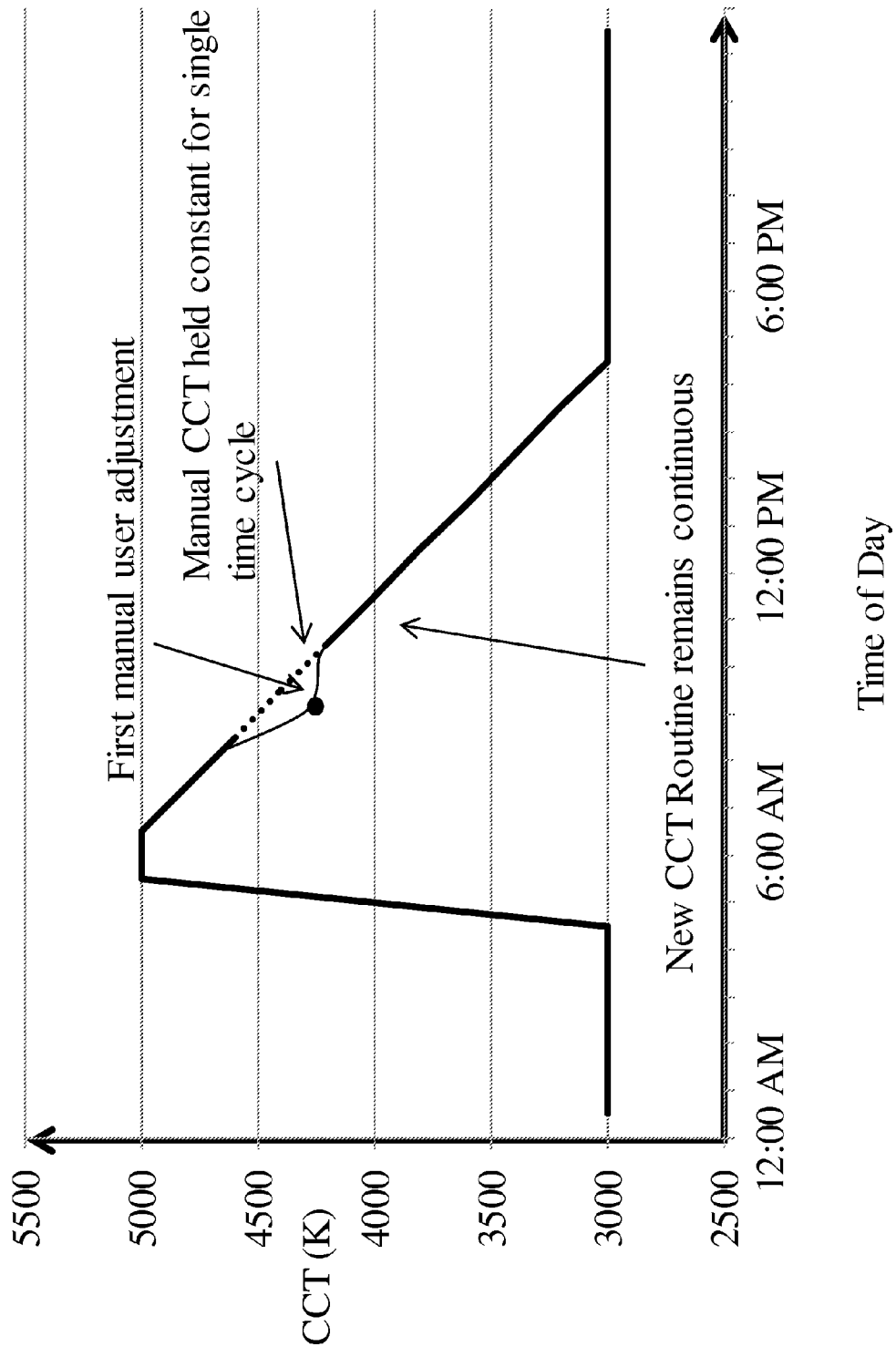
FIG. 4 is a graph depicting an example of the preset lighting control function of FIG. 3 with a manual user adjustment to the lighting control function.

FIG. 4 illustrates a graph of the preset lighting control function, depicted in FIG. 3, as well as a manual user adjustment. At approximately 9 AM, in this example, a user adjusts the CCT of the lighting device 11. Such user adjustment, however, only remains effective for a single time cycle (i.e., one hour in the example). At approximately 10 AM, in this example, the preset lighting control function returns to adjusting the CCT in accordance with the preset schedule. Although not explicitly shown in FIG. 4, such user adjustment, for example, becomes input 1A of the learning system 100 in FIG. 2; and the time of day at which the user adjustment was made, for example, becomes input 1B. In addition, the current CCT of lighting device 11 just prior to the user adjustment, for example, becomes output 7A as the additional input in FIG. 2. These three input values (i.e., user adjustment, time of day, and current CCT) become part of the data set 3 and flow into the machine learning algorithm 5, which influences the actual CCT value of lighting device 11 in response to the user adjustment.

Although FIG. 4 depicts the learning system 100 influencing the CCT value of lighting device 11 in response to the manual user adjustment as a single occurrence, such single occurrence is stored as part of the data set 3 of learning system 100. As a result, at approximately 9 AM on subsequent days, the learning system 100 will, for example, influence the actual CCT value of lighting device 11 in accordance with the previous manual user adjustment. Thus, the data set 3 begins to define a modified lighting control function in contrast to the original (or 'default') preset lighting control function.

Figure 5:
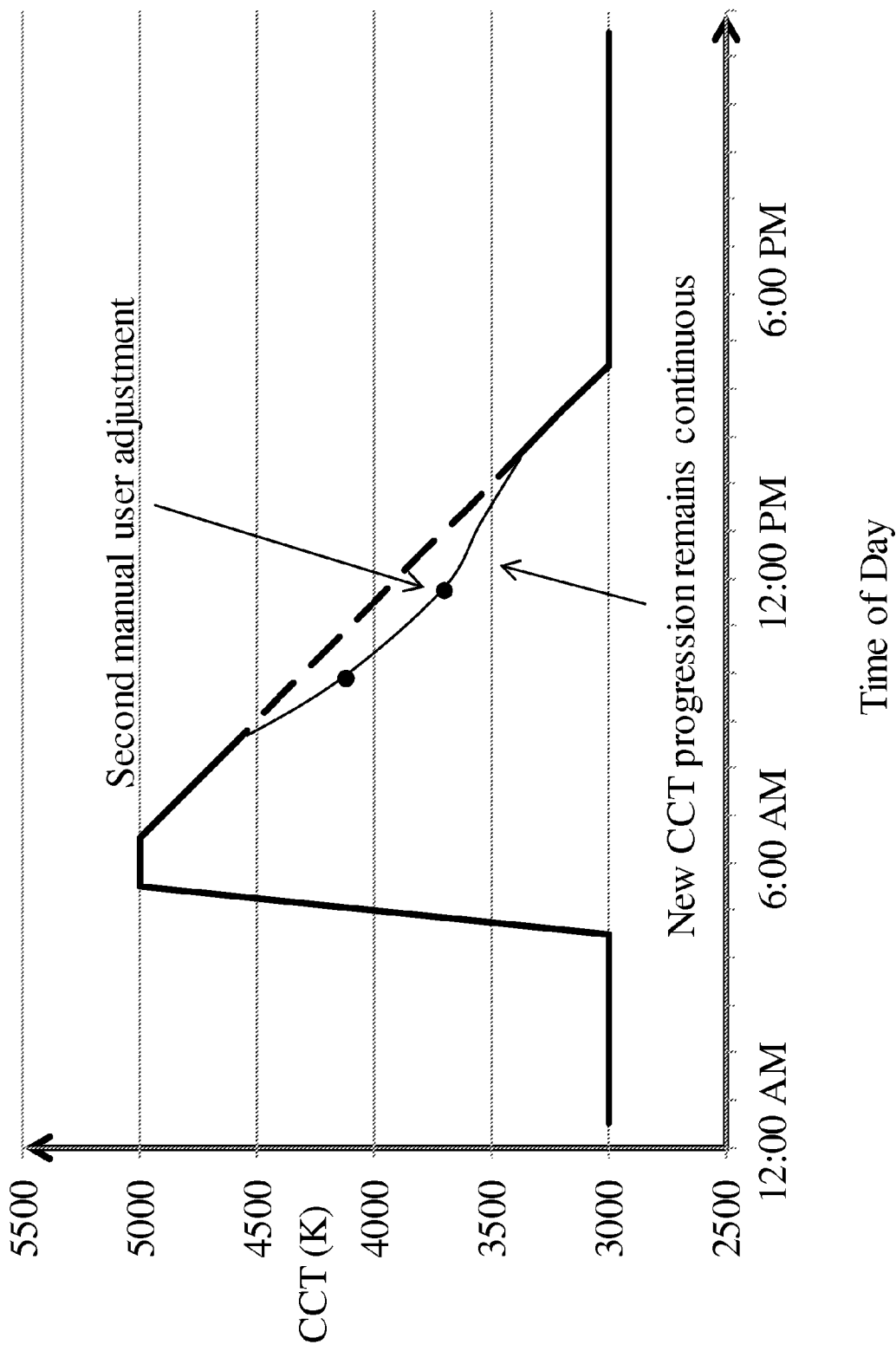
FIG. 5 is a graph depicting an example of the preset lighting control function of FIG. 3 with two manual user adjustments to the lighting control function.

FIG. 5 illustrates a graph of the preset lighting control function and the modified lighting control function based on the first user adjustment of FIG. 4 as well as a second manual user adjustment. Although such second manual user adjustment may be made on the same day as the first user adjustment, for clarity, it is assumed that FIG. 4 represents a previous day and FIG. 5 represents a subsequent day such that the second manual user adjustment is made on a later day than the first user adjustment. Thus, at approximately 9 AM, the learning system 100, based on data set 3 including the first manual user adjustment of FIG. 4, influences the adjustment of the CCT of lighting device 11. Furthermore, at approximately 11 AM, in this example, the user again adjusts the CCT of lighting device 11. This second user adjustment also only remains effective for a single time cycle (i.e., one hour) and then the preset lighting control function returns to adjusting the CCT. As with FIG. 4, although not explicitly shown, this second user adjustment, the time of day of the adjustment, and the current CCT prior to the adjustment are all fed into the learning system 100 of FIG. 2. In this way, the second set of inputs also become part of the data set 3 and flow into the machine learning algorithm 5, which further influences the actual CCT value of lighting device 11 in response to the user adjustment. In addition, as described above, this additional occurrence of a manual user adjustment stored in the data set 3 further defines the modified lighting control function.

Figure 6:
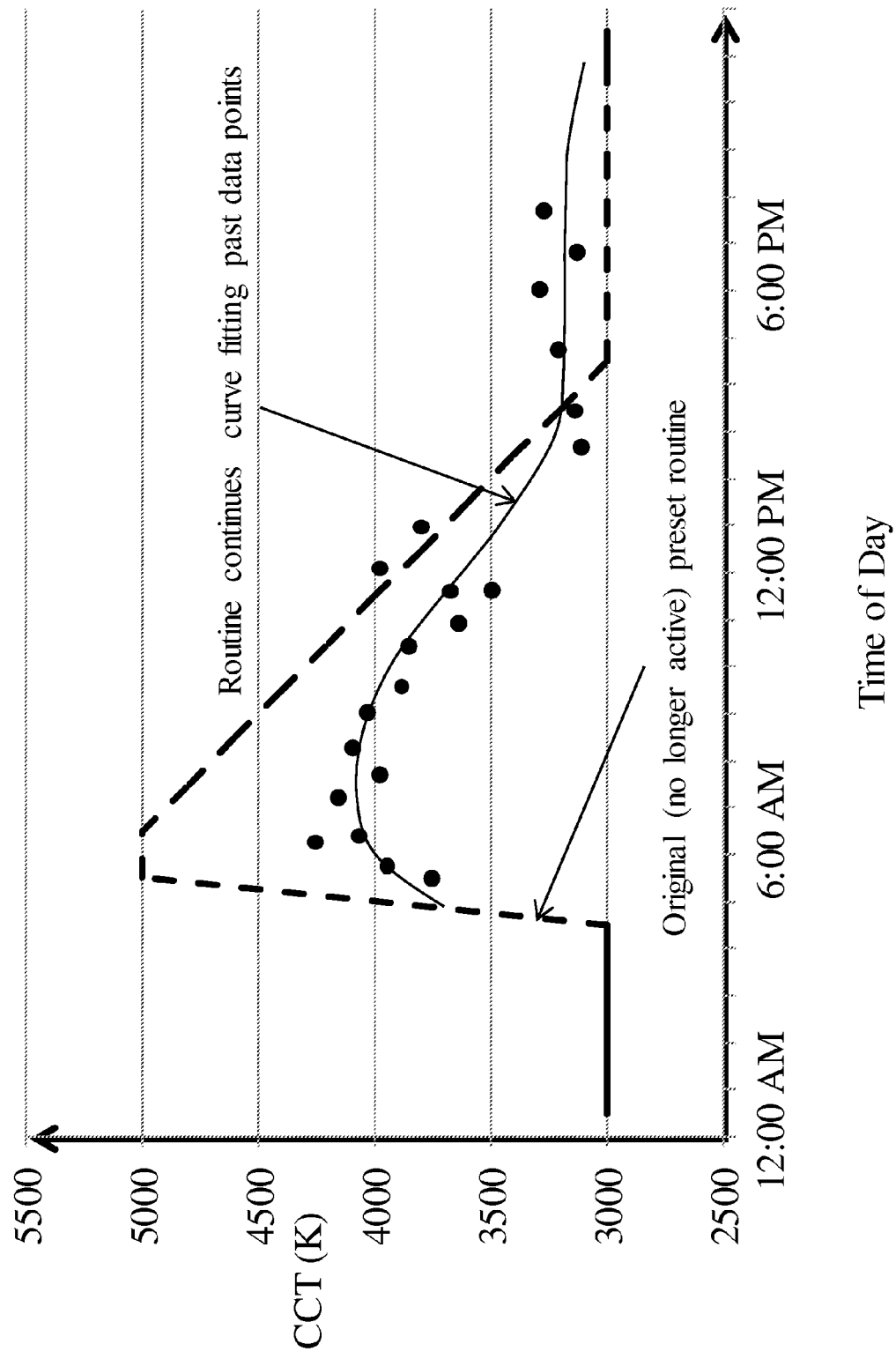
FIG. 6 is a graph depicting an example of a learned lighting control function based on various manual user adjustments to the preset lighting control function.

Over time (e.g., several days to a few weeks), various user adjustments will be made at various times throughout each day. Each additional occurrence of a manual user adjustment not only influences the lighting device 11 adjustment at that time, but also further defines the modified lighting control function. FIG. 6 illustrates a graph of the preset lighting control function and the modified lighting control function based on these various user adjustments. As described above in relation to FIGS. 4-5, these various user adjustments are additional inputs to and add to the data set 3 of the learning system 100 of FIG. 2. Based on the expanded data set 3 and "learning" by the machine learning algorithm 5, a "learned" modified lighting control function, depicted by a solid light curved line in FIG. 6, that more closely matches the various user adjustments replaces the preset lighting control function, depicted by a dashed line in FIG. 6. In this way, adjustable lighting device 11 is, for example, operated in accordance with the modified lighting control function that learns from user interaction and adjusts operations based on user activity.

In some situations, each occurrence of a manual user adjustment may be distinct and not overlap with any other occurrence (i.e., a 9 AM adjustment, a 10 AM adjustment and a 2 PM adjustment). In these situations, the modified lighting control function is simply the collection of all manual user adjustments. In other situations, however, user adjustments may occur in such a way that multiple occurrences overlap (e.g., a 9 AM Monday adjustment that is different from a 9 AM Wednesday adjustment). First, it should be noted that the day of the week would represent an additional input that could be stored in data set 3 and further influence both the current output as well as the modified lighting control function. As discussed above, learning system 100 may be designed with any number of inputs (as well as any number of outputs) in order to capture the necessary complexity of the task. As described in greater detail below, such inputs may include not only direct user input, but also indirect user interaction as well as other conditions sensed from within a space and/or acquired elsewhere. In addition, learning system 100 may be designed with any one or some combination of machine learning algorithm(s) 5. It is this machine learning algorithm 5 that defines how such overlapping occurrences will be combined to influence any given output and the modified lighting control function. In one simple example based on the system 100 of FIG. 2, learning algorithm 5 performs a "best fit" to form a function and/or curve based on the user inputs (e.g., sum all overlapping adjustments and divide by the number of overlapping adjustments to determine an average adjustment).

The learning techniques like those outlined above may be implemented in or control a single lighting device or in a system controlling a few or a substantial number of lighting devices. Even a single standalone device, however, may be network connected if the device is intended to use remote data sources as one or more of the inputs. For discussion purposes, however, we will next consider a system of devices that provides lighting services throughout a premises.

Figure 7A:
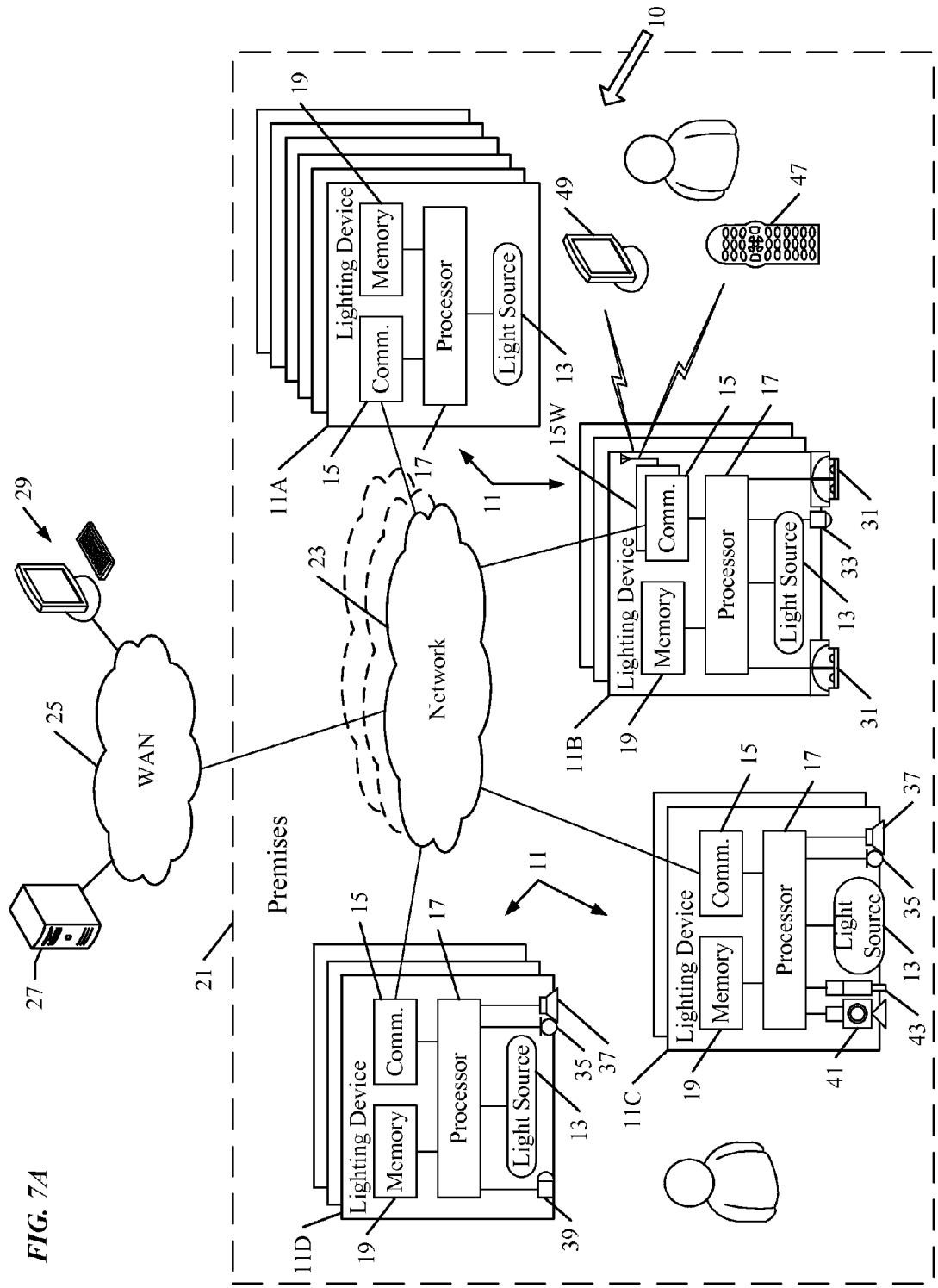
FIG. 7A is a functional block diagram of a simple example of a system having intelligent lighting devices, at least some of which include components and are configured to implement an interactive user interface.

FIG. 7A illustrates an example of a system 10, that may utilize the learning system 100 to control a number of lighting devices 11 at a premises 21, in block diagram form. The illustrated example of the system 10 includes a number of adjustable lighting devices 11, such as fixtures or lamps or other types of luminaires. Control of such lighting devices 11 is, for example, based on identifying one or more occupants of a room or other space within premises 21 and operating the lighting devices 11 in accordance with a corresponding profile of each identified occupant. As described above and further below, such corresponding profile may be learned via learning system 100. Several different configurations of the lighting devices 11 are shown by way of examples. The represented differences amongst the examples of devices 11 will be discussed more fully later.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device 11 may provide light for use by automated equipment, such as sensors/monitors, robots, etc. that may occupy or observe the illuminated space, instead of or in addition to light provided for an organism. A lighting device 11, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) 11 illuminate a service area to a level useful for a human in or passing through the space, e.g. regular illumination of a room or corridor in a building or of an outdoor space such as a street, sidewalk, parking lot or performance venue. However, it is also possible that one or more lighting devices 11 in or on a particular premises 21 served by a system 10 have other lighting purposes, such as signage for an entrance or to indicate an exit. Of course, the lighting devices 11 may be configured for still other purposes, e.g. to benefit human or non-human organisms or to repel or even impair certain organisms or individuals.

Each respective adjustable lighting device 11 includes a light source 13, a communication interface 15 and a processor 17 coupled to control the light source 13. The light sources may be virtually any type of light source suitable to providing illumination that may be electronically controlled. The light may be of the same general type in all of the lighting devices, e.g. all formed by some number of light emitting diodes (LEDs); although in many installations, some number of the lighting devices 11 may have different types of light sources 13.

The processor 17 also is coupled to communicate via the interface 15 and the network link with one or more others of the lighting devices 11 and is configured to control operations of at least the respective lighting device 11. The processor may be implemented via hardwired logic circuitry, but in the examples, the processor 17 is a programmable processor such as a central processing unit (CPU) of a microcontroller or a microprocessor. Hence, in the example of FIG. 7A, each lighting device 11 also includes a memory 19, storing programming for execution by the processor 17 and data that is available to be processed or has been processed by the processor 17. The machine learning algorithm 5 and data set 3 of FIG. 2, as well as a learned profile of each identified occupant, are examples of such programming and data stored in memory 19 for execution and processing by processor 17. The processors and memories in the lighting devices may be substantially the same throughout the devices 11 throughout the premises, or different devices 11 may have different processors 17 and/or different amounts of memory 19, depending on differences in intended or expected processing needs.

In the example, each lighting device has the processor, memory, programming and data set to implement the learning and related control functions under consideration here. These elements, programming, data and functions, however, may be arranged in a system in other ways. For example, in each area of a premises, one lighting device may be configured as a 'leader', to perform learning and high level control, and provide instructions to some number of other 'follower' lighting devices serving the particular area. Another approach might distribute some of the processing on a shared bases across some number of the lighting devices.

Returning to the specific examples, the intelligence (e.g. processor 17 and memory 19) and the communications interface(s) 15 are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities. For example, the communication component(s) and possibly the processor and memory (the 'brain') may be elements of a separate device or component coupled and/or collocated with the light source 13.

In our example, the system 10 is installed at a premises 21. The system 10 also includes a data communication network 23 that interconnects the links to/from the communication interfaces 15 of the lighting devices 11, so as to provide data communications amongst the intelligent lighting devices 11. Such a data communication network 23 also is configured to provide data communications for at least some of the lighting devices 11 via a data network 25 outside the premises, shown by way of example as a wide area network (WAN), so as to allow devices 11 or other elements/equipment at the premises 21 to communicate with outside devices such as the server/host computer 27 and the user terminal device 29. The wide area network 25 outside the premises, may be an intranet or the Internet, for example.

The premises 21 may be any location or locations serviced for lighting and other purposes by a networked intelligent lighting system of the type described herein. The lighting devices 11 are located to provide lighting service in various areas in or about the premises 21. Most of the examples discussed below focus on building installations, for convenience, although the system may be readily adapted to outdoor lighting. Hence, the example of system 10 provides lighting and possibly other services in a number of service areas in or associated with a building, such as various rooms, hallways, corridors or storage areas of a building and an outdoor area associated with a building. Any building forming or at the premises 21, for example, may be an individual or multi-resident dwelling or may provide space for one or more enterprises and/or any combination of residential and enterprise facilities.

The lighting devices 11, as well as any other equipment of the system or that uses the network 23 in the service areas of the premises 21, connect together with and through the network links and any other media forming the communication network 23. For lighting operations, the lighting devices 11 (and other system elements if any) for a given service area are coupled together for network communication with each other through data communication media to form a portion of a physical data communication network. Similar elements in other service areas of the premises are coupled together for network communication with each other through data communication media to form one or more other portions of the physical data communication network at the premises 21. Local communication over the network, for example, enables some number of lighting devices serving a room or other area to coordinate user identifications, input processing, learning and light source control, e.g. to provide coordinated illumination of the particular space.

The communication interface 15 in each lighting device 11 in a particular service area will be of a physical type and configured to operate in a manner that is compatible with the physical media and electrical protocol(s) implemented for the particular service area and/or throughout the premises 23. Although the communication interfaces 15 are shown communicating to/from the network cloud via lines, such as wired links or optical fibers; some or all of the interfaces 15 may use wireless communications media such as optical or radio frequency wireless communication. Also, although the examples in FIG. 7A show most of the lighting devices 11 having one communication interface, some or all of the lighting devices 11 may have two or more communications interfaces to enable data communications over different media with the network(s) and/or with other devices in the vicinity.

The various portions of the network in the service areas in turn are coupled together to form a data communication network at the premises, for example to form a premises-wide local area network (LAN) or the like. The overall premises network, generally represented by the cloud 23 in the drawing, encompasses the data links to/from individual devices 11 and any networking interconnections within respective areas of the premises where the devices 11 are installed as well as the LAN or other premises-wide interconnection and associated switching or routing. In many installations, there may be one overall data communication network 23 at the premises 21. However, for larger premises and/or premises that may actually encompass somewhat separate physical locations, the premises-wide network may actually be built of somewhat separate but interconnected physical networks represented by the dotted line clouds. The LAN or other data network forming the backbone of system network 23 at the premises 21 may be a data network installed for other data communications purposes of the occupants; or the LAN or other implementation of the network 23, may be a data network of a different type installed substantially for lighting system use and for use by only those other devices at the premises that are granted access by the lighting system elements (e.g. by the lighting devices 11). Communications amongst devices serving different areas of the premises, for example, may enable communication of some relevant input data, enable device(s) in one area to obtain a user profile from a device in another area, and/or support a distributed implementation of some or all of the relevant processing.

Hence, there typically will be data communication links within a room or other service area as well as data communication links from the lighting devices 11 in the various rooms or other service areas out to wider network(s) forming the data communication network 23 or the like at the premises 21. Devices 11 within a service area can communicate with each other, with devices 11 in different rooms or other areas, and in at least some cases, with equipment such as 27 and 29 outside the premises 21. For example, server 27 implements an on-line service and device(s) 11 and/or system 10 communicate with server 27 to determine a status of an identified occupant for the on-line service.

Various network links within a service area, amongst devices in different areas and/or to wider portions of the network 23 may utilize any convenient data communication media, such as power lines wiring, separate wiring such as coax or Ethernet cable, optical fiber, free-space optical, or radio frequency wireless (e.g. Bluetooth or WiFi); and a particular premises 21 may have an overall data network 23 that utilizes combinations of available networking technologies. Some or all of the network communication media may be used by or made available for communications of other gear, equipment or systems within the premises 21. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system 10 at the premises 21 or may already be present from an earlier data communication installation. Depending on the size of the network 23 and the number of devices and other equipment expected to use the network 23 over the service life of the network 23, the network 23 may also include one or more packet switches, routers, gateways, etc.

In addition to a communication interface 15 for enabling a lighting device to communicate via the network 23, some of the devices 11 may include an additional communication interface, shown as a wireless interface 15W in the lighting device 11B. The additional interface allows other elements or equipment, such as a host computer or server like 27, to access the communication capabilities of the system 10, for example, as an alternative user interface access or for access through the system 10 to the WAN 25.

A host computer or server like 27 can be any suitable network-connected computer, tablet, mobile device or the like programmed to implement desired network-side functionalities. Such a device may have any appropriate data communication interface to link to the WAN 25. Alternatively or in addition, a host computer or server similar to 27 may be operated at the premises 21 and utilize the same networking media that implements data network 23 directly and/or via an additional communication interface such as wireless interface 15W in lighting device 11B.

The user terminal equipment such as that shown at 29 may be implemented with any suitable processing device that can communicate and offer a suitable user interface. The terminal 29, for example, is shown as a desktop computer with a wired link into the WAN 25. However, other terminal types, such as laptop computers, notebook computers, netbook computers, and smartphones may serve as the user terminal computers. Also, although shown as communicating via a wired link from the WAN 25, such a user terminal device may also or alternatively use wireless or optical media; and such a device may be operated at the premises 21 and utilize the same networking media that implements data network 23 directly and/or via an additional communication interface such as wireless interface 15W in lighting device 11B.

For various reasons, the communications capabilities provided at the premises 21 may also support communications of the lighting system elements with user terminal devices, control panels, standalone sensors and/or computers (not shown) within the premises 21. The user terminal devices and/or computers within the premises may use communications interfaces and communications protocols of any type(s) compatible with the on-premises networking technology of the system 10. Such communication with a user terminal, for example, may allow a person in one part of the premises 21 to communicate with a lighting device 11 in another area of the premises 21, to obtain data therefrom and/or to control lighting or other system operations in the other area.

The external elements, represented generally by the server/host computer 27 and the user terminal device 29, which may communicate with the intelligent elements of the system 10 at the premises 21, may be used by various entities and/or for various purposes in relation to operation of the lighting system 10 and/or to provide information or other services to users within the premises 21, e.g. via the interactive user interface portal offered by the lighting devices 11.

Returning now to the lighting devices 11, in the example of the system 10, at least one of the lighting devices 11 includes a user input sensor configured to detect user activity related to user inputs without requiring physical contact of the user; and at least one of the lighting devices 11 includes an output component configured to provide information output to the user. The drawings show several different examples of these input/output elements.

By contrast, some of the lighting devices 11 may not have user interface related elements. In the example of system 10 in FIG. 7A, each of the lighting devices 11A includes a light source 13, a communication interface 15 linked to the network 23 and a processor 17 coupled to control the light source 13 and to communicate via the interface 15 and the link to network 23. Such devices 11A may include lighting related sensors (not shown), such as occupancy sensors or ambient light color or level sensors; but the intelligent lighting devices 11A do not include any user interface components, for user input or for output to a user (other than control of the respective light source 13). The processors of devices 11A are configured (e.g. programmed in our example) to control lighting operations, for example, to control the light sources 13 of such devices 11A in response to commands received via the network 23 and the interfaces 15. The processors of devices 11A are also configured, for example, with the machine learning algorithm 5 of FIG. 2 such that the processors of devices 11A learn from the controlled lighting operations.

Figure 7B:
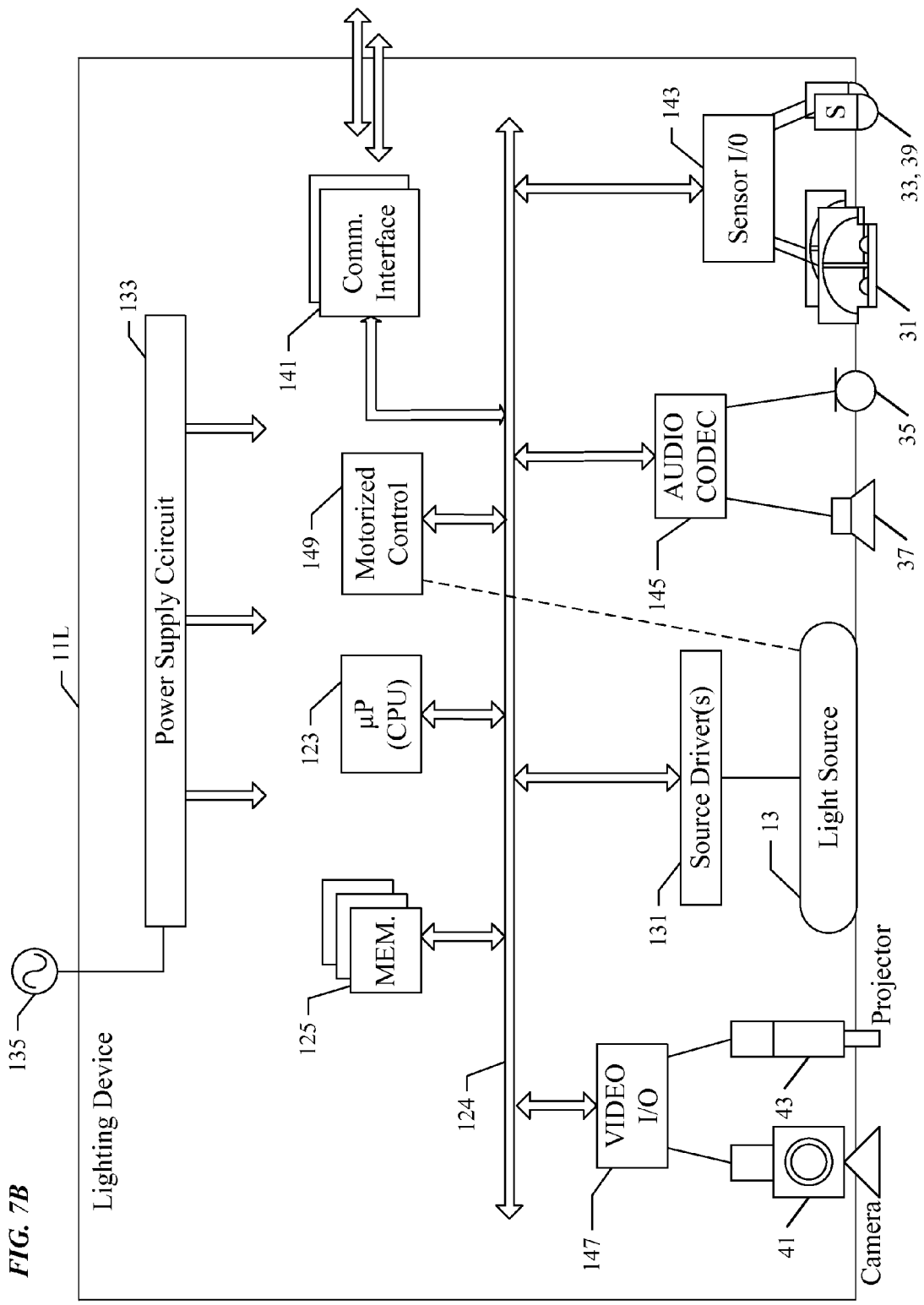
FIG. 7B is a functional block diagram of an example of an intelligent lighting device that may be used in the system of FIG. 7A.

For purposes of discussion, the drawing (FIG. 7A) shows three examples of lighting devices 11B, 11C and 11D that have one or more user interface components. Although three examples are shown, it is envisaged that still other types of interface components and/or arrangements thereof in various lighting devices may be used in any particular implementation of a system like the system 10 of FIG. 7A; and the later more detailed example of FIG. 7B shows a device that incorporates a combination of several different user input and output components. Furthermore, although the examples depict user interface components integrated within lighting device 11, such interface components may alternatively and/or additionally be implemented as standalone elements of or within other devices of system 10 and communications via the network(s), as discussed further below. Any one lighting device that includes components to support the interactive user interface functionality of the system 10 may include an input sensor type user interface component, an output type user interface component, or a combination of one or more input sensor type user interface components with one or more output type user interface components.

Although the various sensors are referred to generally as user input sensors and may include any combination of user interface components, such user input and/or user interface need not necessarily require direct user activity or direct interactivity with the light device 11. As described in greater detail below, the user activity referred to herein may be user interaction directly with the lighting device 11 intended to control a lighting function (e.g., the user deliberately intends to turn the light off or otherwise change a light or other control setting and gestures to the device to effect such change), the user activity may be interaction directly with other aspects of the space and indirectly with the lighting device 11 for control purposes (e.g., the user interacts with a terminal device within the space and the lighting device 11, based on task recognition and learned user preferences, adjusts operations accordingly), and/or the user activity may somewhat unintentionally interact with, and thus indirectly control, the lighting device 11 and/or system 10 (e.g., the user intentionally drinks a cup of tea when the user typically drinks a cup of coffee, unintentionally indicating a different mood of the user to the lighting device 11, which adjusts operations accordingly). An agitated conversation may be deliberate in a general sense, but not intended as a specific command to the system 10 to change a control setting; yet the system 10 may detect the agitated conversation as an indication of mood and respond by adjusting lighting and/or other environmental conditions in the occupied space.

With reference to FIG. 7A, each of some number of intelligent lighting device 11B at the premises 21 includes one or more sensors 31 (two in the illustrated example). The lighting devices 11B can be in one or more rooms or other service areas at the premises 21. In the intelligent lighting devices 11B, each of the sensors 31 is configured for detection of intensity of received light and to support associated signal processing to determine direction of incident light. A particular example of a sensor 31 that can be used as an input device for determining direction and intensity of incident light received by the sensor 31 is a quadrant hemispherical light detector or "QHD" (see e.g. U.S. Pat. Nos. 5,877,490 and 5,914,487). The sensors 31 may detect light in some or all of the visible portion of the spectrum or in other wavelength bands, such as infrared (IR) or ultraviolet (UV). By using two or more such sensors 31 in the same or a different lighting device 11B illuminating the same service area, it is possible to detect position of an illuminated point or object in three-dimensional space relative to known positions of the sensors 31. By detecting position of one or more points over time, it becomes possible to track motion within the area illuminated by the device(s) 11B and monitor for user input by the sensors 31, for example, as a gestural user input or when a user transitions from location for one typical type of task to location for another type of task (e.g., transitioning from reviewing documents on a desk to interacting with a computer on the desk). Detection of rapid motion (e.g., pacing or hand gestures) may provide another technique to detect agitation of the occupant. Although two sensors 31 are shown on one lighting device 11B; there may be more sensors 31 in a lighting device 11B, or there may be a single sensor 31 in each device 11B amongst some number of the lighting devices 11B illuminating a particular service area of the premises 21.

In the example, at least one of the devices 11B also includes a lighting related sensor 33. Although shown in device 11B for purposes of discussion and illustration, such a sensor may be provided in any of the other lighting devices 11, in addition or as an alternative to deployment of the sensor 33 in a lighting device 11B. Examples of such lighting related sensor 33 include occupancy sensors, device output (level or color characteristic) sensors and ambient light (level or color characteristic) sensors. The sensor 33 may provide a condition input for general lighting control, e.g. to turn on-off devices 11 and/or adjust light source outputs. However, the sensor input information from sensor 33 also or alternatively may be used as another form of user input, for example, to refine detection and tracking operations responsive to signals from the sensors 31.

In an example of a user input related function, the signals from the sensors 31 in lighting devices 11B illuminating a particular room within premises 21 are processed to detect gestures of one or more persons/users within the room. The lighting output from sources 13 of the devices 11 illuminating the area may be controlled responsive to the detection of one or more predetermined user input gestures based on user profile(s) and/or a learned control function. Alternatively, or in addition to gestural input, the signals from the sensors 31 are processed to detect a task or other activity of one or more persons/users within the room. The lighting output from sources 13 of the devices 11 illuminating the area may be controlled responsive to the detection of one or more predetermined or learned user input activities or task(s) based on the user's profile and/or learned control function. Although not shown, one or more of the lighting devices 11B may also include a user output component, for example to provide an audio or video output of information to the person or persons in the room.

Such gesture or user activity input together with lighting control and other information output implement a form of interactive user interface. This interface related operation includes selectively controlling a lighting operation of at least some number of the lighting devices as a function of a processed user input. The interface related operation may also include either control of a non-lighting-related function as a function of a processed user input, or an operation to obtain and provide information as a response to a user input as an output via the output component.

In the example of system 10, each of the intelligent lighting devices 11C and/or one or more of the lighting devices 11D in one or more rooms or other service areas of the premises 21 support audio input and audio output, for an audio based user interface functionality. These input components may be provided in different lighting devices 11 than those deploying the output elements. Also, audio user interface components may be provided in different lighting devices 11 than those deploying the video user interface components. For convenience, the audio input and output components and the video input and output components are shown together in each of the intelligent lighting devices 11C, one or more of which may be deployed with other lighting devices in some number of the services areas within premises 21.

Hence, in the example of FIG. 7A, each intelligent lighting device 11C and/or one or more of the lighting devices 11D includes an audio user input sensor such as a microphone 35. Any type of microphone configured to detect audio user input activity, for example, for speech recognition of verbal commands or the like, may be used; and some other types of sensors may be used if they provide adequate response to audio input. Although the audio output may be provided in different devices 11; in the example, each of the intelligent lighting devices 11C or 11D also includes an audio output component such as one or more speakers 37 configured to provide information output to the user. Where the speaker is provided in the same or a different device 11, there may be a single speaker 37 in each such device 11 or there may be some number of speakers in each respective lighting device 11.

The audio input together with lighting control and audio information output implement a form of interactive user interface. Again, the user interface related operation includes selectively controlling a lighting operation of at least some number of the lighting devices 11 as a function of a processed user input. The interface related operation may also include either control of a non-lighting-related function as a function of a processed user input, or an operation to obtain and provide information as a response to a user input as an output via the output component.

Although shown for illustration purposes in the intelligent lighting device 11C, image-based input and/or output components may be provided together or individually in any others of the lighting devices 11 that may be appropriate for a particular installation. Although referred to at times as "video," the image-based input and/or output may utilize still image input or output or may use any appropriate form of motion video input or output. Hence, in the example of system 10, each of several of the intelligent lighting devices 11D in one or more rooms of the premises 21 also supports image input and output for a visual user interface functionality. Although related audio input and audio output could be implemented in other lighting devices, in the example, the devices 11C also have the microphone 35 and the speaker 37 for the audio based user interface functionality outlined above.

For the visual user interface functionality, an intelligent lighting device 11C includes at least one camera 41. The camera 41 could be a still image pickup device controlled to capture some number of images per second, or the camera 41 could be a video camera. By using a number of cameras 41 to capture images of a given service area, it is possible to process the image data to detect and track user movement in the area, for example, to identify user input gestures or when a user transitions from one task to another task (e.g., transitioning from reviewing documents on a desk to interacting with a computer on the desk) in addition to or as an alternative to processing of inputs via sensors 31. The multiple cameras 41 could be in a single lighting device 11C or could be provided individually in two or more of the lighting devices that illuminate a particular room or other service area. The image capture may also support identification of particular individuals, e.g. via processing of images for face recognition, and associated customization of gesture recognition and/or user responsive system operations.

The visual output component in the lighting device 11C is a projector 43, such as a pico projector, in this example. The visual output component may take other forms, such as an integral display as part of or in addition to the light source. Returning to the example of FIG. 7A, the projector 43 can present information in a visual format, for example, as a projection on a table or a desk top or a wall or the floor. Although shown in the same device 11C as the camera 41, the projector 43 may be in a different intelligent lighting device 11. Also, the projector may be provided in a device 11 in an area that does not utilize a camera 41 for the user input sensor. For example, the projector 43 may be in a device or in a service area with another device 11 that utilizes a microphone (35) or the like as an audio sensor for spoken user input in an area that may also use sensors such as 31 in one or more devices 11B to detect gestural inputs or other user activity or task(s).

The combination of image-based input together with lighting control and image-based and/or audio information output implement a form of interactive user interface. Again, the user interface related operation includes selectively controlling a lighting operation of at least some number of the lighting devices 11 as a function of a processed user input based on the user's profile and/or learned control function. The interface related operation may also include either control of a non-lighting-related function as a function of a processed user input, or an operation to obtain and provide information as a response to a user input as an output via the output component.

In the example, one or more of the processors 17 in the lighting devices 11 are configured to process user inputs detected by the user input sensor(s), such as the visual sensors 31, 33, 41, microphone(s) 35 and/or light sensors 33. Of course, other non-contact sensing technologies may be used (e.g. ultrasound) instead of or in combination with the input sensors discussed above. The processing of sensed user inputs, including for learning and profile based control, may relate to and control operations of the lighting devices 11 in one or more areas of the premises 21. For example, the processing may detect spoken commands and/or relevant gestural inputs or other direct and indirect inputs from a user and, based on the learning algorithm and/or user profile, control lighting devices 11 in an area in which the user currently is located. For example, the resulting output control signals may serve to turn lights ON/OFF, to raise or lower lighting intensity, to change a color characteristic of any tunable lighting devices 11 and/or various combinations of such changes. As other examples, state changes responsive to the resulting outputs may include changes of any one or any combination of: light distribution shape, spectral content (without changing color), aperture and/or fixture shape/size, fixture aim, color and/or luminance uniformity across fixture output, etc. Changes in light output(s) in response to detected user inputs may also produce a repeating pattern or other sequence of changes in any one or more of the examples or still other lighting related parameters, e.g., so as to convey information or direct attention or to provide a desired variable lighting effect (such as a variable color 'light show' or mood lighting). Changes in the lighting in the occupied area of premises 21 in response to such sensed user inputs would provide the user with a visual cue as part of the interactive user interface functionality. The user inputs also may be processed to control lighting devices 11 serving other areas of the premises 21.

In addition to lighting control functions, such as mentioned here by way of example, one or more processors 17 in the intelligent lighting devices 11 may be configured to process direct and/or indirect user inputs so as to enable the system 10 to obtain and present requested information to a user at the premises 21 and/or obtain requested or otherwise relevant information about the user for use and/or processing by system 10, some element within system 10, and/or some other element or device at the premises 21. By way of an example of such additional operations, the system 10 may also enable use of the lighting devices 11 to form an interactive user interface portal, for access to other resources at the premises 21 (e.g., on users computers in other rooms at the premises) and/or access to outside network resources such as on server 27 or a remote terminal 29 (e.g. via the WAN 25). Alternatively, or in addition, such obtained information may also be processed as user inputs by one or more processors 17 in the intelligent lighting devices 11 to control a lighting function. For example, as described in greater detail below, one or more processors 17 may access an on-line service to which a user is subscribed, such as might be hosted on server 27 (e.g., Facebook™, Twitter™, etc.), and determine an on-line status corresponding to the subscribed user. In this example, such on-line status may be processed as an additional user input to enhance the interactive user interface functionality.

In the example, one or more of the memories 19 store the user inputs detected by the user input sensor(s) as data set 3 of the learning system 100 and one or more of the processors 17 in the intelligent lighting devices 11 are configured to implement the machine learning algorithm 5 of the learning system 100. In this way, the intelligent lighting devices 11 learn, for example, from the various user inputs detected by the user input sensor(s) and the one or more processors 17 may incorporate such learning into the operations of the system 10 to implement a lighting control function.

Although shown for illustration purposes in the intelligent lighting device 11D, any one or more of the lighting devices 11 may include a sensor 39 for detecting operation of the lighting source 13 within the respective device 11. Such a sensor 39 may sense a temperature of the source 13 or of other component(s) of the device 11D, or a sensor 39 may sense an optical output of the source 13 (e.g. level or color characteristic). The sensor 39 essentially provides feedback as to the state of the source 13 or other component(s) of the device 11D, which may be used as part of the general control of the lighting device(s) 11. By way of an example, where the performance of the source may have an effect on sensing of user inputs, e.g. when a device 11B or 11C in a particular service area optically detects gestures or other visual user inputs, source related feedback from sensor 39 may be used to adjust output of the source 13 in one or more of the devices illuminating the area in a manner intended to assist in the detection of the visual user input (e.g. to ensure adequate illumination for gesture detection).

In a system such as system 10 of FIG. 7A, the lighting devices 11 incorporate the elements and provide processing to support an interactive user interface, for example, that need not require the user to touch or otherwise physically contact an element of the system. The user also need not have or operate a separate device, such as a smartphone or other portable terminal device. The lighting devices themselves implement the interactive user interface to the lighting system, and the user interacts with the lighting system, either intentionally or unintentionally, via the lighting devices 11. Furthermore, such interactive user interface is not based solely on intentional user interaction directly with the lighting system. As described above and in greater detail below, the various sensors 31, 33, 35, and 41 may capture, as user inputs, other user activity, either intentional or unintentional and involving either direct interaction with the lighting system for control of the lighting system or indirect interaction through other objects and/or occupants within the space illuminated by the lighting system. In addition, the lighting system may acquire user inputs from external sources, such as the user's status for an on-line service (e.g., Facebook™, Twitter™, etc.), and, based on these user inputs from external sources, modify the operation of the lighting system. The lighting system, for example, also learns from these current user inputs as well as a collection of prior user inputs to modify the operation of the lighting system via implementation of learning system 100 of FIG. 2, as described in greater detail below.

The user interface through the lighting device is given by way of example. The system 10, however, may also include or support communications for other elements or devices at the premises 21, some of which may even offer alternative user interface capabilities instead of or in addition to the interactive user interface supported by the lighting devices 11. For example, the intelligence (e.g. processor 17 and memory 19) and the communications interface(s) 15 may be implemented in other elements or devices (i.e. control panel) of system 10. Additionally, standalone sensors of the lighting system that are interconnected to the data communication network of the system may perform sensing functions analogous to those of sensors 31, 33, 35, 37, 39, 41 and/or 43 in the system 10. See, for example, U.S. application Ser. No. 13/903,330, Filed May 28, 2013 entitled "LIGHTING NETWORK WITH AUTONOMOUS COMMISSIONING", and U.S. application Ser. No. 13/964,564, Filed Aug. 12, 2013 entitled "LIGHTING ELEMENT-CENTRIC NETWORK OF NETWORKS", both of which are entirely incorporated by reference.

The system 10 of FIG. 7A may also support wireless communication to other types of equipment or devices at the premises 21, to allow such other equipment or devices to use the network 23 and/or to communicate with the lighting devices 11. By way of example, present drawing FIG. 7A therefore shows one of the lighting devices including a wireless communication interface 15W, for such a purpose.

Although shown in 11B, such an interface 15W may instead or in addition be provided in any of the other lighting devices 11 in the system 10. Of note for purposes of the present discussion of user interface techniques, the wireless link offered by the wireless communication interface 15W allows the system 10 to communicate with other user interface elements at the premises 21 that are not included within lighting devices 11 but which may be used in addition or as a supplement to the lighting device-centric user interface that is otherwise the focus of the present discussion. Although there may be any of a wide range of such other types of user interface elements at any given premises 21, the drawing shows two examples, a remote control 47 as an additional input device and a television or monitor 49 as an additional output device. The wireless link(s) to devices like 47 and 49 may be optical, sonic (e.g. speech), ultrasonic or radio frequency, by way of a few examples.

Any of the various system elements may be implemented using a PC like approach based on any known or available microprocessor architecture, such as a Reduced instruction set computing (RISC) using an ARM architecture, as commonly used today in mobile devices and other portable electronic devices, or a microprocessor architecture more commonly used in computers such as an instruction set architecture (ISA), like those used in Intel microprocessors and the like. The microprocessor based approaches are discussed by way of examples, with respect to FIG. 7B; however, other processor implementations may be used, such as based on a Peripheral Interface Controller (PIC) or other microcontroller architecture. Alternative intelligent architectures for the intelligence of the devices, however, will still include appropriate communication interfaces and couplings for light sources and may include other standardized ports for connections of sensors, user input/output devices, etc.

Turning now to the example of FIG. 7B, the drawing depicts an implementation of an intelligent lighting device 11L using a microprocessor centric architecture. The device 11L is illustrated as an example of one of the devices 11 as may be used in an overall lighting system like system 10 of FIG. 7A. A similar arrangement of lighting device 11L, however, may be deployed as an independent/standalone luminaire without reliance on other devices or elements of a premises-wide system 10.

At a high level, the fixture or other type of lighting device includes a light source, a power supply circuit coupled to a power source, a processor, one or more memories and a communication interface; and the device will often include one or more sensors. The user interface components may be separate from the lighting device. The example 11L incorporates elements for a non-contact user interface portal. To act as a portal, the lighting device will also have one or more standard interface ports for attachment of elements for providing the desired type of user interface. Each port may be for a hardwired connection to any compatible accessory or may provide a wireless link (e.g. WiFi, Zigbee or Bluetooth) for the accessory.

As an example of an implementation of the processors 17, discussed above relative to FIG. 7A, the more detailed example of the lighting device 11L includes a microprocessor (µP) 123, which serves as the programmable central processing unit (CPU) of the lighting device 11L. The µP 123, for example, may be a type of device similar to microprocessors used in servers, in personal computers or in tablet computers, or in smartphones, or in other general purpose computerized devices. Although the drawing shows a single µP 123, for convenience, the lighting device 11L may use a multi-processor architecture. The µP 123 in the example is of a type configured to communicate data at relatively high speeds via one or more standardized interface buses, represented generally by the bus/arrow 124.

The lighting device 11L includes one or more storage devices, which are accessible by the µP 123 via the bus 124. Although the lighting device 11L could include a hard disk drive or other type of disk drive type storage device, in the example, the device 11L includes one or more memories 125. Typical examples of memories 125 include read only memory (ROM), random access memory (RAM), flash memory and the like. In this example, the memory or memories 125 store executable programming for the µP 123, such as programming implementing the machine learning algorithm 5 of learning system 100, as well as data, such as data set 3 of learning system 100, for processing by or resulting from processing of the µP 123.

As in earlier examples, the intelligent lighting device 11L includes a light source 13. The source 13 may take the form of an existing fixture or other luminaire coupled to the other device components, or the source 13 may be an incorporated source, e.g. as might be used in a new design or installation. The source 13 may be any type of source that is suitable to the illumination application (e.g. task lighting, broad area lighting, object or personnel illumination, information luminance, etc.) desired for the space or area in which the particular device 11L is or will be operated which offers desired light output control capabilities (e.g. dimming, color control etc.). Although the source 13 in the device 11L may be any suitable type of light source, many such devices will utilize the most modern and efficient sources available, such as solid state light sources, e.g. LED type light sources. To support color control, the device may include some number of LEDs of each of two or more different color characteristics operated via independently controllable driver channels.

Power is supplied to the light source 13 by an appropriate driver 131. The source driver 131 may be a simple switch controlled by the processor of the device 11L, for example, if the source 13 is an incandescent bulb or the like that can be driven directly from the AC current. Power for the lighting device 11L is provided by a power supply circuit 133 which supplies appropriate voltage(s)/current(s) to the source driver 131 to power the light source 13 as well as to the components of the device 11L. In the example, the power supply circuit 133 receives electricity from alternating current (AC) mains 135, although the lighting device may be driven by a battery or other power source for a particular application. Although not shown, the device 11L may have or connect to a back-up battery or other back-up power source to supply power for some period of time in the event of an interruption of power from the AC mains 135.

The source driver circuit 131 receives a control signal as an input from the processor 123 of the device 11L, to at least turn the source 13 ON/OFF. Depending on the particular type of source 13 and associated driver 131, the processor input may control other characteristics of the source operation, such as dimming of the light output, pulsing of the light output to/from different intensity levels, color characteristics of the light output, etc. If the source and/or driver circuit have the capability, the driver circuit 131 may also provide some information back as to the operation of the light source 13, e.g. to advise the processor 123 of the actual current operating state of the source 13.

The lighting device 11L also includes one or more communication interfaces 141. The communication interfaces at least include an interface configured to provide two way data communication for the μP (and thus for the device 11L) via the network 23. In the example of FIG. 7B, each communication interface 141 is of a type having a bus interface to enable the interface 141 to communicate internally with the μP 123 via the bus 124. The interface 141 that provides the communication link to the data communications network 23 enables the μP 123 to send and receive digital data communications through the particular network 23. As outlined earlier, the network 23 may be wired (e.g. metallic or optical fiber), wireless (e.g. radio frequency or free space optical), sonic or ultrasonic, or a combination of such network technologies; and the interface 141 to that network 23 in a particular installation of the device 11L will correspond to the most advantageous network available (based on considerations such as cost and bandwidth) at the location of the installation. Some devices 11L may include multiple interfaces to the network 23; and or some devices 11L may include interfaces (analogous to the interface 15W discussed earlier) for communication with other equipment in the vicinity.

The lighting device 11L in this example further includes a motorized control 149. Such motorized control 149 allows the lighting device 11L and/or elements within the lighting device 11L (i.e., light source 13, microphone 35, camera 41, sensors 31, 33, 39, etc.) to be moved and/or adjusted. In one example, the motorized control 149, in response to user input, moves the lighting source 13 back and forth in a swaying fashion, as if to "wave". The control 149 may adjust source 13 orientation to spotlight and follow a user as the user moves about a room, as another example. In still another example, the motorized control 149 moves camera 41 so as to track the movement of an occupant through the space.

A device like 11A in the FIG. 7A example may have just the components of device 11L discussed to this point in our more detailed example. However, for implementations of devices like 11B to 11C in the FIG. 7A example, the device 11L may have one or more user input sensors configured to detect user activity related to user inputs and/or one or more output components configured to provide information output to the user. Although the input and output elements and/or such elements of different types, for convenience, the device 11L shown in FIG. 7B includes both input and output components as well as examples of several types of such components.

In the example, the intelligent lighting device 11L includes a number of optical sensors, including one of more of the sensors 31 configured for detection of intensity of received light and to support associated signal processing to determine direction of incident light. The intelligent lighting device 11L in this example also includes another type light sensor, such as a sensor 33 or 39. Although only one circuit 143 is shown for convenience, the device 11L will include appropriate input/output interfaces to operate and receive signals from the applicable sensors 31, 33 and 39 included in the particular implementation of the device 11L.

A sensor such as 31, 33 or 39 typically includes one or more physical condition detectors, which form the actual device that is responsive to the particular condition to be sensed. The detector(s) may receive a drive signal; and in response to the sensed condition, the detector(s) produces one or more signals having a characteristic (e.g. voltage magnitude, current or frequency) that is directly related to a characteristic level of the sensed condition. A sensor such as 31, 33 or 39 also includes a detector interface circuit that provides any drive signal that may be needed by the particular device type of physical condition detector. The detector interface circuit also processes the output signal from the detector to produce a corresponding output, in a standardized format.

The sensor I/O circuit 143 in turn provides the input and output interface to couple the particular sensor(s) 31, 33 or 39 with the other components of the intelligent lighting device 11L. On the side logically facing the bus and processor, the sensor I/O circuitry 143 in the illustrated architecture provides a bus interface that enables the μP 123 to communicate with the respective I/O interface circuit 143 via the bus 124. A port for coupling the circuit 143 to the bus 124 may be in accordance with a standard, such as USB. Although not shown, the sensor I/O circuit 143 may fit a standard interface port on the board forming the 'brain' and communication portion of the device 11L; and/or the sensor I/O circuit 143 may provide physical and electrical connections as well as a protocol for the interface with the applicable sensor such as 31, 33 or 39 in accordance with a standard, to allow use of sensors by different manufacturers.

The description of the sensors and I/O circuitry are given by way of example, and actual implementations may use somewhat different arrangements. For example, the detector interface circuit referred to above as part of the sensor may be incorporated in the applicable sensor I/O circuit 143. Each of the circuit(s) 143 may be configured to provide the electrical interface for one, two or more of the respective sensors via the associated coupling(s).

In the example, the intelligent lighting device 11L includes a microphone 35, configured to detect audio user input activity, as well as an audio output component such as one or more speakers 37 configured to provide information output to the user. Although other interfaces may be used, the example utilizes a bus connect audio interface circuit that is or includes an audio coder/decoder (CODEC), as shown at 145. The CODEC 145 converts an audio responsive analog signal from the microphone 35 to a digital format and supplies the digital audio to the μP 123 for processing and/or a memory 125 for storage, via the bus 124. The CODEC 145 also receives digitized audio via the bus 124 and converts the digitized audio to an analog signal which the CODEC 145 outputs to drive the speaker 37. Although not shown, one or more amplifiers may be included to amplify the analog signal from the microphone 35 or the analog signal from the CODEC 145 that drives the speaker 37.

In the example, the intelligent lighting device 11L also includes a camera 41, configured to detect visible user input activity, as well as an image (still or video) output component such as a projector 43, configured to provide information output to the user in a visual format. The lighting device will also include appropriate input signal processing circuitry and video driver circuitry, for example, as shown in the form of a video input/output (I/O) circuit 147. The interface(s) to either one or both of the camera 41 and the projector 43 could be analog or digital, depending on the particular type of camera and projector. The video I/O circuit 147 may also provide conversion(s) between image data format(s) used on the bus 124 and by the μP 123 and the data or signal formats used by the camera 41 and the projector 43.

The actual user interface elements, e.g. speaker and/or microphone or camera and/or projector, may be in the lighting device 11L or may be outside the device 11L with some other link to the fixture. If outside the lighting device 11L, the link may be a hard media (wire or fiber) or a wireless media.

The device 11L as discussed above and shown in the drawing includes user interface related components for audio and optical (including image) sensing of user input activities. That intelligent lighting device also includes interface related components for audio and visual output to the user. These capabilities of the device 11L and the system 10 support an interactive user interface through the lighting device(s), for example, to control lighting operations, to control other non-lighting operations at the premises and/or to provide a portal for information access (where the information obtained and provided to the user may come from other equipment at the premises or from network communications with off-premises systems). In addition, the interactive user interface is enhanced via implementation of the learning system 100 of FIG. 2, as described in greater detail below.

For example, the device 11L and/or the system 10 can provide a voice recognition/command type interface via the lighting device and network to obtain information, to access other applications/functions, etc. For example, a user can ask for the system to check his/her calendar and/or the calendar of someone else and can ask the system to schedule a meeting. Furthermore, based on lighting operations during prior meetings and user activity during the scheduled meeting, device 11L and/or the system 10, influenced by learning system 100, may adjust and/or otherwise control lighting operations during the scheduled meeting.

In an initial implementation, the speech is detected and digitized in the lighting device 11L and is processed to determine that the lighting device 11L has received a command or a speech inquiry. For an inquiry, the lighting device 11L sends a parsed representation of the speech through the lighting system 10 (and possibly an external network 25) to a server or the like with full speech recognition capability. The server identifies the words in the speech and initiates the appropriate action, for example, to turn OFF or otherwise control light source 13. The server sends the information back to the lighting device 11L (or possibly to another device) with the appropriate output capability, for presentation to the user as an audible or visual output. Any necessary conversion of the information to speech may be done either at the server or in the lighting device, depending on the processing capacity of the lighting device. As the processing capacity of lighting devices increases, some or all of the functions of the server in this example may be shifted into the lighting devices.

The lighting device 11L and the system 10 may provide similar services in response to gestural inputs, detected via sensors 31, one or more cameras 41 or a combination of sensors and cameras. Also, systems that include both audio and optical input components can respond to combinations of speech and gestural inputs. Systems that include both audio and video output components can present information to the user(s) in various desirable combinations of audio and image or video outputs.

With an approach like that outlined above, the lighting system may support a broad range of applications or functions often performed via other user terminal devices. For example, the user may be able to post to social media, access social media, send messages via mobile message (e.g. text) or instant messaging or email. The system with the interface portal enables the lighting system/service provider or some other operator of the system 10 to offer other services, such as information access and personal communication. The lighting device 11 and/or system 10 may detect when the user enters the area and provide notices to appropriate 'friends' or the like. In addition, as described in greater detail below, the lighting system may also capture this information provided via the interface portal (i.e., social media status update and/or message content), utilize the captured information to learn about the user (e.g., current mood, plans, deadlines, etc.) and modify the operation of the lighting system to reflect the user's current condition and/or situation.

Figure 8:
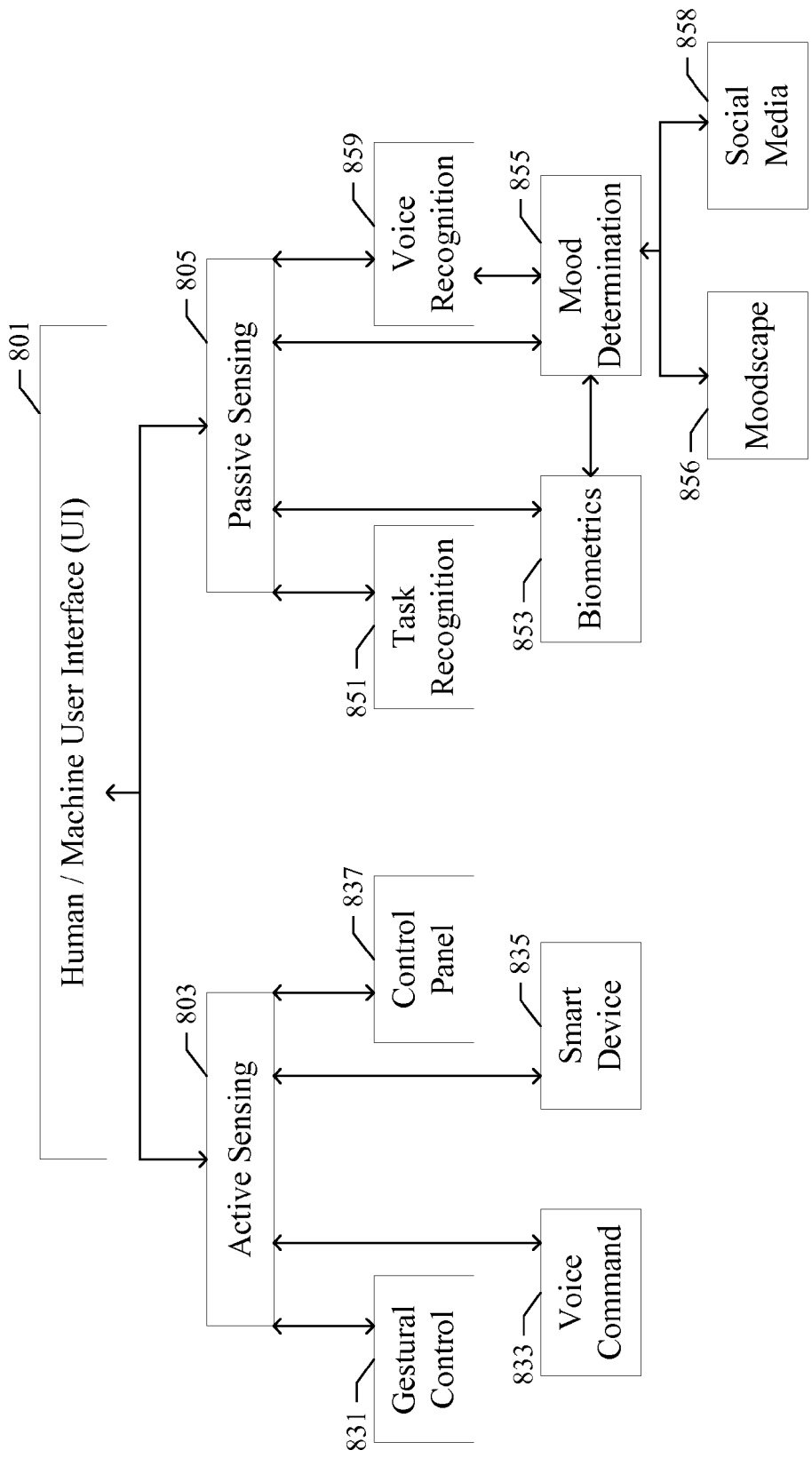
FIG. 8 is a functional block diagram of an example human/machine user interface that may be implemented by the system of FIG. 7A.

The interactive user interface implemented by lighting devices 11 and/or lighting system 10 in conjunction with learning system 100 may generally be referred to as a human/machine user interface. FIG. 8 illustrates a functional block diagram of an example of such human/machine user interface. In the example of FIG. 8, human/machine user interface 801 includes active sensing 803 and passive sensing 805. Active sensing 803 includes, for example, sensing intentional direct user activity such as gestural control 831, voice command 833, control via a smart device 835, and/or control via a control panel 837. Examples of such active sensing 803 were described in greater detail above in relation to FIG. 7A. Passive sensing 805 includes, for example, intentional and/or unintentional indirect user activity and/or user status(es) such as task recognition 851, biometrics 853, mood determination 855 and/or voice recognition 859. Stated another way, active sensing 803 involves lighting device(s) 11 and/or lighting system 10 responding directly to sensed user input (e.g., a voice command to turn a lighting device 11 off) while passive sensing 805 involves lighting device(s) 11 and/or lighting system 10 utilizing intentional and/or unintentional, direct and/or indirect sensed user input as part of a determination related to the user (e.g., voice recognition sensing frustration in a user's voice during a conversation between two occupants of a space). Although some reference to passive sensing 805 was included in the discussion of FIG. 7A, greater detail will be provided here and further below.

Task recognition 851 involves, for example, determining a task being performed by a user. In one example, image sensor 41 of lighting device 11C senses that a user is positioned in front of a user terminal. Based on this sensed input, task recognition 851 would determine that the user is performing a task involving the user terminal. As a result, lighting device 11C may be adjusted to provide a better suited lighting operation for the user while performing this task. Although the sensed input is related to the user and the user is, in this example, intentionally interacting with the user terminal, such intentional user activity is not directed to interaction with lighting device 11C and/or lighting system 10. Thus, task recognition 851 is passively sensing the user's activity, and lighting device 11C and/or lighting system 10 may be adjusted based on this passive sensing. As a further example, when the user transitions to reviewing papers on the desk, sensor 31 might identify the movement triggering image sensor 41 to capture an image of this new activity. Task recognition 851 then utilizes these inputs to identify this new task and further adjust lighting device 11C and/or lighting system 10 to provide a better suited lighting operation for this new task.

Biometrics 853 involves, for example, utilizing physical characteristics in the process of identifying a particular individual. In the example of FIG. 7A, an occupancy sensor such as sensor 33 of lighting device 11B identifies that an occupant has entered a room or space serviced by lighting device 11B. Based on the occupancy sensed by sensor 33, biometrics 853 utilizes, for example, image sensor 41 and microphone 35 of lighting device 11C to determine specific characteristics of the occupant that uniquely identify the occupant (i.e., User A as opposed to User B). This may involve pattern recognition to identify user features, e.g. face recognition or relative user dimensions in comparison to one or more objects in a room, etc. Based on the identification provided by biometrics 853, lighting device(s) 11 and/or lighting system 10 may be adjusted to better suit the preferences of the identified occupant, typically by controlling one or more operations based on a user profile and/or learned preferences via learning system 100.

Voice recognition 859, for example, utilizes acoustics to help identify a particular individual. In this way, voice recognition 859 is similar to and may use or be used by and/or in conjunction with biometrics 853. In addition, voice recognition 859 involves, for example, utilizing acoustical characteristics in the process of identifying the mood and/or actions of one or more occupants within a space. In one example, microphone 35 of lighting device 11C captures the voices of two occupants within a room or space serviced by lighting device 11C. Voice recognition 859, utilizing the captured voices, determines that at least one occupant is agitated and/or that a heated discussion is on-going (e.g., one or both voices are louder than normal). In response, lighting device 11C and/or lighting system 10 may be adjusted to influence and/or mitigate the actions of the occupants, for example, by lowering the intensity and/or changing color of the illumination of the room or other space occupied by the agitated parties.

Mood determination 855 involves, for example, determining the current mood of an individual. As depicted in FIG. 8 by the bi-directional arrows, mood determination 855, for example, utilizes biometrics 853 and/or voice recognition 859 as part of the determination process. Mood determination 855 may also utilize the current moodscape 856 (i.e., lighting and/or other conditions in the space that may impact mood) as well as status updates provided via social media 858. In one example, a lighting device 11 and/or the lighting system 10 identifies an occupant, as previously described, and, based on the identification, utilizes the information portal discussed above to retrieve on-line status updates for the occupant via social media 858. The on-line status updates indicate the occupant is happy and/or generally in a good mood. At the same time, based on conditions sensed by various sensors, the lighting device 11 and/or lighting system 10 determines the current moodscape 856 includes a bright, sunny morning. In addition, voice recognition 859, in this example, determines that the occupant is whistling. In light of this feedback from social media 858, moodscape 856 and voice recognition 859, mood determination 855, for example, determines the occupant is currently experiencing a good mood and lighting device 11 and/or lighting system 10 are adjusted to reinforce this good mood. Intensity or color etc. of the illumination may change and/or the system may change one or more other environmental control(s), e.g. set point temperature and/or blower speed of a heating, ventilation, and air conditioning (HVAC) component.

Figure 9:
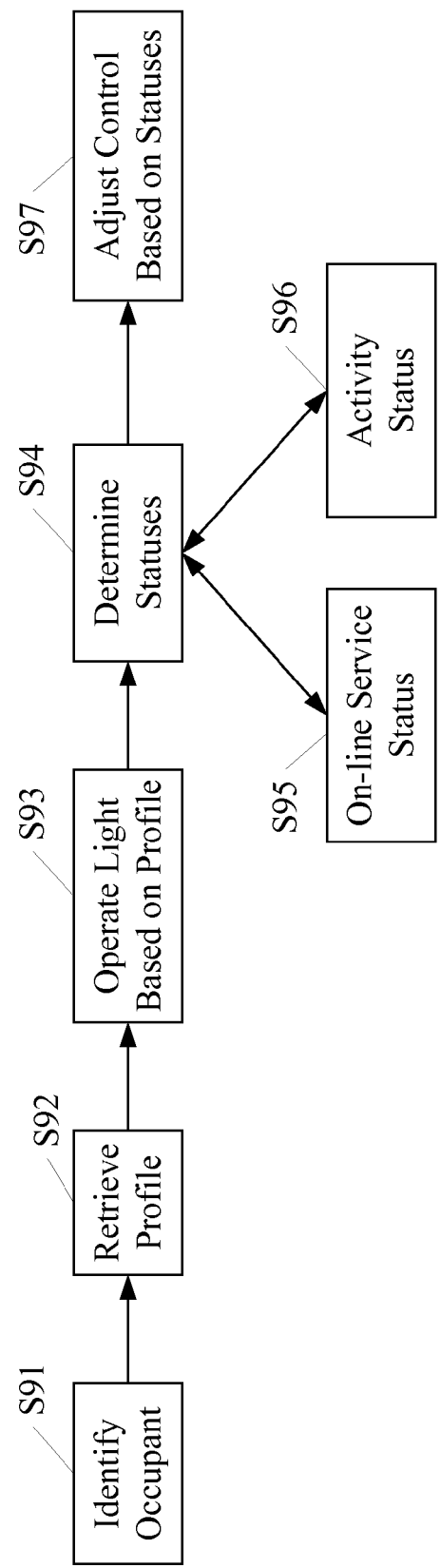
FIG. 9 is a flow chart of an example process to implement lighting with the system of FIG. 7A using the learning system of FIG. 1.

The human/machine user interface 801 utilizes active sensing 803 and passive sensing 805 to implement an enhanced interactive user interface for lighting devices 11 and/or lighting system 10. In addition, incorporation of the learning system 100 further enhances the interactive user interface by allowing the lighting devices 11 and/or lighting system 10 to learn from and adjust operations based upon individual occupants with a room or space. FIG. 9 illustrates an example of a process by which a lighting device 11 and/or a system 10 operate and/or are adjusted based on learning via learning system 100.

In step S91, a lighting device 11 and/or system 10 identifies an occupant of a room or other type of space serviced by one or more lighting devices 11. As described above, such occupant identification is, for example, based on biometrics 853 and/or voice recognition 859 as part of passive sensing 805 of the human/machine user interface 801. Alternatively, or in addition to, such identification may be based on active sensing 803. For example, lighting device 11 and/or system 10 identifies the occupant based on an identifier of the occupant (e.g., pattern on a badge, a smart badge (e.g., RFID), an identifier emitted by a mobile device, etc.) sensed by and/or otherwise obtained by one or more of the various sensors or user input elements.

In step S92, the lighting device 11 and/or system 10 retrieves a profile corresponding to the identified occupant. The profile includes a lighting control function established for the identified occupant. The profile is initially established, for example, as a preset and/or default lighting control function, either by the identified occupant, a manufacturer, an administrator of the lighting system 10 and/or some other individual or entity. Alternatively, or in addition to, the profile is developed or updated over time by learning via the learning system 100, as discussed in greater detail below. The lighting control function defines at least one of a plurality of parameters of visible light to be output by a light source 13 (e.g., level, CCT, etc.). Furthermore, the preset and/or default lighting control function defines a set of standardized responses (i.e., corresponding change to at least one of the plurality of parameters and/or other control of lighting device 11) based upon sensed activity. In step S93, the lighting device 11 and/or lighting system 10 operate the light source 13 in accordance with the lighting control function included in the retrieved profile.

Additionally and/or alternatively, such retrieved profile of step S92 includes an environmental control function corresponding to an environmental condition of the room or other type of space, and corresponding elements of system 10 are operated in step S93 to control the environmental condition in accordance with the environmental control function. For example, if the environmental condition is room temperature, the environmental control function operates one or more HVAC components in setting and maintaining the desired room temperature. As another example, the environmental condition may be the position and/or transparency of electromechanical window blinds or shades and the environmental control function operates the blinds or shades throughout the day.

In step S94, the lighting device 11 and/or lighting system 10 determines at least one status corresponding to the identified occupant of the space. For example, in step S95, lighting device 11 and/or lighting system 10 utilize the information portal to determine a status for the identified occupant with an on-line service. As discussed above, for example, mood determination 855 of passive sensing 805 within the human/machine user interface 801 utilizes social media 858 to determine the status for the identified occupant with the on-line social media service. Alternatively, or in addition to step S95, lighting device 11 and/or lighting system 10, for example, determines an activity for the identified occupant in step S96. As discussed above, the human/machine user interface 801 utilizes, for example, task recognition 851 to determine such identified occupant activity (e.g., interacting with user terminal, reviewing papers, talking on the phone, moving within the space, etc.).

As a result of determining the on-line service and/or activity statuses in step S94, the lighting device 11 and/or lighting system 10 adjusts the lighting control function to control the operation of the light source 13 in step S97. In one example, lighting device 11 and/or lighting system 10 determines that the identified occupant recently posted a status to an on-line service indicating the identified occupant is upset and/or otherwise frustrated. As a result, lighting device 11 and/or lighting system 10 adjusts the control of light source 13 to help reduce and/or alleviate the identified occupant's frustration based on a standardized response defined by the occupant's profile. In another example, lighting device 11 and/or lighting system 10 determines that the identified occupant is conducting a heated telephone conversation. As a result, lighting device 11 and/or lighting system 10 adjusts the control of light source 13 to offset the identified occupant's agitated state, once again based on a standardized response defined by the occupant's profile. In yet another example, lighting device 11 and/or lighting system 10 determines that the identified occupant is conducting the heated telephone conversation after recently posting to an on-line service about being upset and/or otherwise frustrated. As a result, lighting device 11 and/or lighting system 10 adjusts, based on the profile defined response, the control of light source 13 to both help reduce and/or alleviate the identified occupant's frustration and offset the identified occupant's agitated state. In this way, the system 10 discovers or learns "current activity" from and/or about the occupant and responds to such "current activity learning". In each of these examples, the adjustment, although based on "current activity learning", is predefined and/or standardized based on the occupant's profile.

As in steps S92 and S93, step S97 may additionally and/or alternatively adjust an environmental control function based on determining the on-line service and/or activity statuses in step S94. In the electromechanical blinds or shades example, system 10 may determine, based on task recognition 851, that an occupant has placed his or her head on the desk, in which case the system 10 operates the blinds or shades in such a way as to maximize the amount of sunlight entering the room or other type of space and encourage the occupant to return to other work activities. Furthermore, the system 10 also adjusts the control of light source 13 to enhance work lighting. Once again, these responses by system 10 are, for example, predefined by the occupant's profile.

The system in our example 'learns' in two ways. The system learns some current inputs and the system learns how best to respond to current inputs based on a control function 'learned' from historical information. The historical learning may use direct user feedback and/or earlier less direct user inputs. Hence, in the examples, such adjustments in step S97 are based on a determination of one or more current statuses of the identified occupant or "current activity learning" and a predefined and/or standardized response based on the occupant's profile. Alternatively, or in addition to, such adjustments are based, for example, on a determination of one or more current statuses and a determination of one, all, or some combination of prior determined statuses, in particular, prior determined statuses as a result of previous predefined and/or standardized responses. Such "historical or feedback based learning" takes prior determined statuses as a result of prior predefined and/or standardized responses as feedback into the learning system, such as learning system 100.

For example, in the context of FIGS. 2 and 9, learning system 100, as part of step S97, may take as input the determined activity status that the occupant is engaged in a heated telephone conversation (i.e., input 1A). The learning system 100, further as part of step S97, may also take as input the fact, stored in data set 3, that, during a previous heated conversation when the color characteristics of light source 13 were changed based on a standardized response (i.e., output 7K), the conversation continued to remain heated while during a similar conversation when the occupant dimmed the light source 13, the conversation returned to normal tones. As a result, learning system 100, in step S97, may provide an output control signal that adjusts the light source 13 to be dimmed. In this way, the lighting device 11 and/or lighting system 10 receives prior determined statuses (i.e., discovered or learned "current activity" in the past) as feedback that allows the lighting device 11 and/or lighting system 10 to learn and modify the predefined and/or standardized responses based on such learning.

As an additional example of direct feedback, lighting device 11 and/or lighting system 10 is configured to operate in accordance with a preset lighting control function, such as the function described above in relation to FIGS. 3-6 above. Specifically, lighting device 11 and/or lighting system 10 operates some number of light sources 13, for example, in a manner that simulates the rise, traversal, and setting of the sun throughout a standard work day of 9 AM to 5 PM. In this example, however, an occupant's work day begins at 3 PM and continues until midnight. As such, when the system starts to transition the light source 13 into the evening hours, the occupant manually adjusts the light source 13 to reflect the occupant's modified work day. Over time and based on "historical or feedback based learning", lighting device 11 and/or system 10 will begin to operate based on a developed or modified lighting control function taking into account the occupant's manual adjustments and modified work day.

As a further learning example, in the case of the blinds or shades, system 10 may determine, based on previous activity status determinations, that the occupant regularly places his or her head on the desk at a similar time each day and for a similarly regular period of time. In addition, in response to the system 10 opening the shades and raising the lights on previous occasions, the occupant closes the shades and lowers the lights. In response, the system 10 learns that the occupant intends for this regular period of time to be a time of rest. As such, as the initial time approaches, system 10 operates the blinds or shades to minimize the amount of sunlight entering the room or other type of space and adjusts light source 13 to enhance the occupants rest. Then, after the regular period of time, system 10 operates the blinds or shades to maximize sunlight while also adjusting light source 13 to restore optimal working conditions.

That is, the system learns not only the occupants current activity, but also learns the occupant's previous responses to the system's predefined and/or standardized responses to similar previous activity as well as the occupant's previous responses to other conditions and/or situations. Thus, the system 10 learns how to modify the predefined and/or standardized responses in a personalized fashion, thereby developing or learning a modified profile associated with the identified occupant. In this example, the identified occupant previously made one or more manual adjustments to the lighting control function (i.e., increasing the light intensity while reviewing papers) corresponding to the lighting device 11 and/or lighting system 10 determining one or more previous statuses for the identified occupant and making an adjustment based on a standardized response (i.e., system 10 previously decreased the light intensity when task recognition 851 determined the occupant was reviewing papers). Such manual adjustments serve as feedback that the standardized response was not appropriate for this particular occupant. Utilizing learning system 100, as described above, lighting device 11 and/or lighting system 10 learns from the previous manual adjustments and previous determinations to influence the determination of current statuses and/or the adjustments to operations of the light source 13 (i.e., system 10 now increases the light intensity when task recognition 851 determines this occupant is reviewing papers). As such, the adjustments are a result of the current determined statuses, the current determined statuses influenced by previously determined statuses, and/or similar user adjustments in similar situations. In this way, the system 10 utilizes "historical or feedback based learning" to develop a modified profile for an identified occupant. In addition, system 10 utilizes this modified profile or "historical or feedback based learning" to respond to "current activity learning" of the identified occupant.

Figure 10:
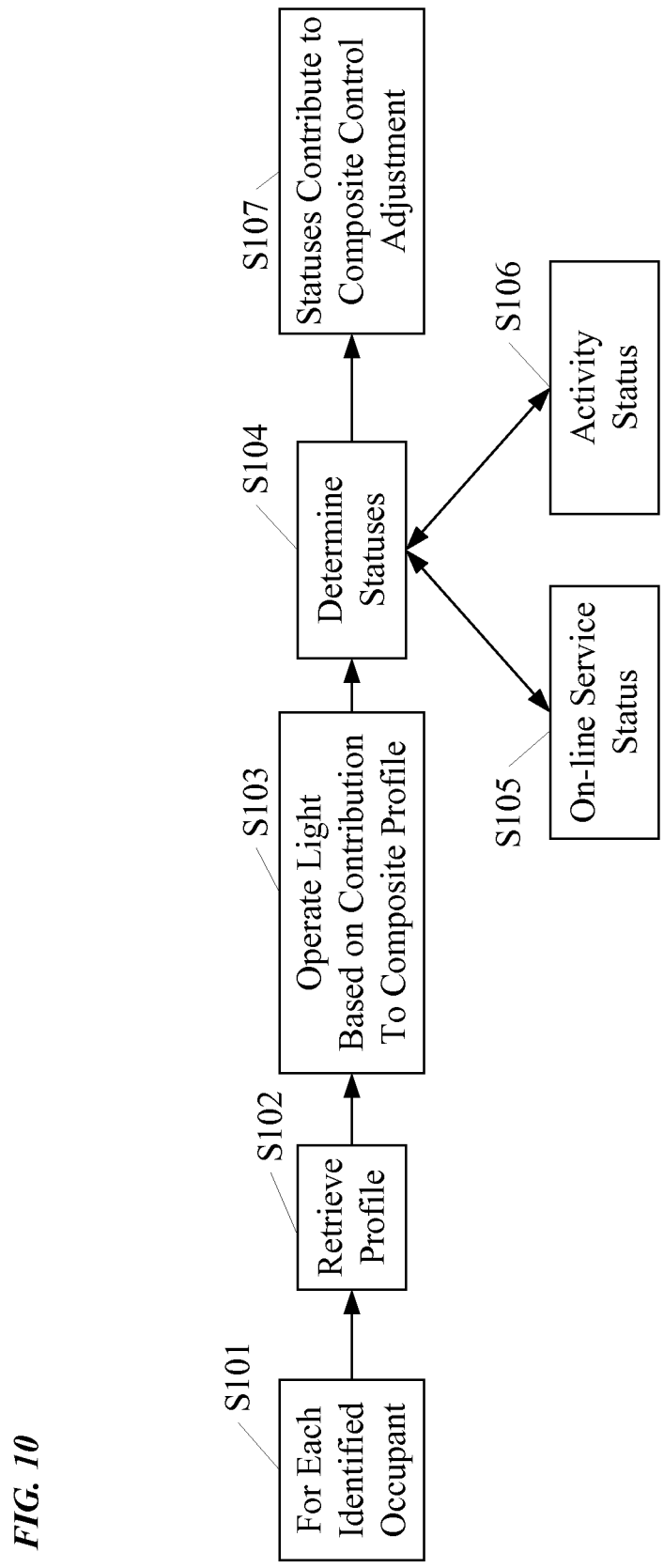
FIG. 10 is a flow chart of another example process to implement lighting with the system of FIG. 7A using the learning system of FIG. 1.

While FIG. 9 depicts an example of a process involving a single identified occupant, FIG. 10 illustrates an example of a process involving multiple identified occupants for use by the lighting device 11 and/or lighting system 10.

In step S101, a lighting device 11 and/or lighting system 10 identifies occupants, similar to step S91 of FIG. 9. In some situations, lighting device 11 and/or lighting system 10 is able to identify all of the occupants. In other situations, lighting device 11 and/or lighting system 10 may only identify one or more of the occupants. For each of the identified occupants in step S101, lighting device 11 and/or lighting system 10 retrieves a profile, established for the identified occupant, including a lighting control function in step S102.

Although not shown, a default profile, including a default lighting control function, is retrieved, for example, for any unidentified occupant. Furthermore, as with FIG. 9, any profile may additionally and/or alternatively include an environmental control function and lighting device 11 and/or lighting system 10 may operate and/or adjust one or more elements to control an environmental condition of the room or other type of space. For simplicity, however, the following examples only refer to a lighting control function and operation and/or adjustment of the light source 13.

In step S103, operation of the light source 13 is controlled based on the contribution each retrieved profile makes to a composite profile. For example, each profile contains a weight corresponding to how the retrieved profile contributes to the composite profile. The weight may be a single weight corresponding to the profile as a whole or the weight may comprise individual weights corresponding to individual parameters of visible light output controlled by the lighting control function (e.g., level has a corresponding weight, CCT has a corresponding weight, etc.). In some situations, the profile comprises a corresponding weight for each parameter controlled by the lighting control function. In other situations, the profile only comprises a corresponding weight for those parameters controlled by the lighting control function that differ from a default value. In still other situations, the lighting control function only comprises those parameters for which the lighting control function controls the parameter in variance to some default and the profile comprises weights for all of those parameters or only some subset of those parameters.

In one example, the retrieved profile with the highest (or lowest) weight controls and the composite profile is the retrieved profile with such weight. In another example, each retrieved profile contributes to the composite profile proportionally based on the corresponding weight. In such an example, a weighted utility function may be utilized to maximize or minimize the corresponding contribution of each retrieved profile.

Utility is an economic term generally referring to the total satisfaction received from consuming a good or service. A utility function represents a consumer's preference for an individual item in relation to a collection of items. Thus, utility functions are utilized in modeling or theory. In one example, the lighting device 11 and/or lighting system 10 develops a utility function, or preference relation, for each identified occupant. That is, based on the "historical learning" of learning system 100, lighting device 11 and/or lighting system 10 determines each identified occupant's preferences for the various parameters controlled by the lighting control function included in that identified occupant's profile. Further in the example, the lighting device 11 and/or lighting system 10 develops a composite utility function, or composite preference relation, that incorporates the utility function of each identified occupant and the weight corresponding to each identified occupant's profile (i.e., U=f(U1, U2, . . . , k1, k2)). Finally, lighting device 11 and/or lighting system 10 maximizes or minimizes the composite utility function in order to determine a corresponding lighting control parameter value that incorporates the weighted preferences of each identified occupant (e.g., if the corresponding parameter is CCT, an optimal U will minimize the root mean square (RMS) between the actual value and the weighted preferences of each identified occupant).

In step S104, lighting device 11 and/or lighting system 10 determine statuses for each identified occupant, similar to step S94 of FIG. 9. In step S105, an on-line service status is determined for each identified occupant, if available, and an activity status is determined, in step 106, for each identified occupant, if available. As a result of determining one or more statuses for each identified occupant, lighting device 11 and/or lighting system 10, in step S107, performs a composite adjustment. Such composite adjustment is based, similar to step S103, on a contribution by each identified occupant and/or corresponding profile.

Like the example of FIG. 9, the process example of FIG. 10 may utilize the learning system 100 such that lighting control operations and adjustments are performed based on learning from some combination of current and/or previous operations and/or adjustments. Although not explicitly shown, such learning influences, for example, current operations and adjustments as well as future operations and adjustments.

Figure 11:
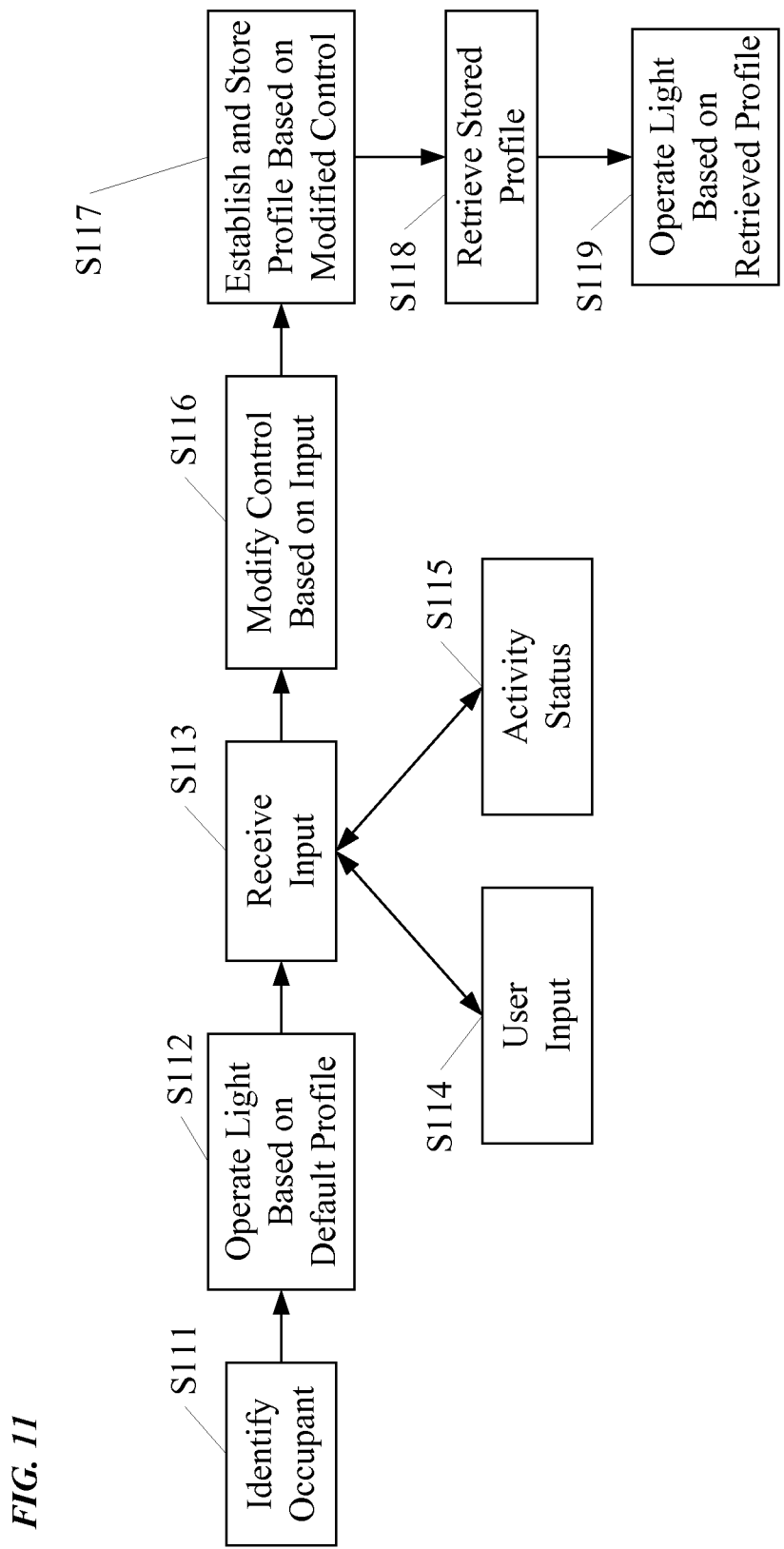
FIG. 11 is a flow chart of still another example process to implement lighting with the system of FIG. 7A using the learning system of FIG. 1.

FIGS. 9-10 depict examples of processes whereby an established lighting control function is implemented and adjusted based on determined statuses of one or more identified occupants. FIG. 11 illustrates an example process whereby a lighting control function is initially established and adjusted based on learning.

In step S111, a lighting device 11 and/or lighting system 10 identifies an occupant of a room or space serviced by lighting device 11. As discussed above, such identification is, for example, via passive sensing 805 and/or active sensing 803. In step S112, a light source 13 is operated based on a default profile. In step S113, input is received by the lighting device 11 and/or lighting system 10. In one example, the user provides an input in step S114. Such user input is one of a gestural control 831, a voice command 833, control via a smart device 835 and/or control via a control panel 837 as part of active sensing 803 discussed in greater detail above. In another example, the lighting device 11 and/or lighting system 10 utilizes passive sensing 805 to determine an activity status in step S115. In this example, lighting device 11 and/or lighting system 10 utilizes task recognition 851, voice recognition 859 and/or some other passive sensing to determine an activity for the identified occupant.

Based on the received input in step S113, operation of the light source 13 is modified in step S116. In step S117, a profile corresponding to the identified occupant and the received input is established and stored. That is, the profile is established based on learning implemented via learning system 100 by the lighting device 11 and/or lighting system 10. Such learning is based on current user input, in step S114, and/or current determined activity status, in step S115. As discussed above, such learning, in some situations, is also based on past user input and/or past user activity. In step S118, the stored profile is retrieved and, in step S119, light source 13 is operated based on the retrieved profile. As such, a profile is developed based on learning by the lighting device 11 and/or lighting system 10 and the learned profile is retrieved in order to operate a light source 13 in accordance with the learned profile.

The discussion above has outlined the structure and configuration of lighting devices 11 and systems 10 of such devices as well as several techniques for implementing an interactive user interface that relies on information retrieval as well as user inputs and learned behavior. The user interface could be implemented via processing by as few as one of the lighting devices 11. However, many installations will take advantage of processing by a substantial number of the intelligent lighting devices 11. For complex operations, such as processing of audio or optical inputs to detect speech or gestural user inputs respectively, it may also be advantageous to perform some or all of the relevant processing using a distributed processing technique.

Figure 14:
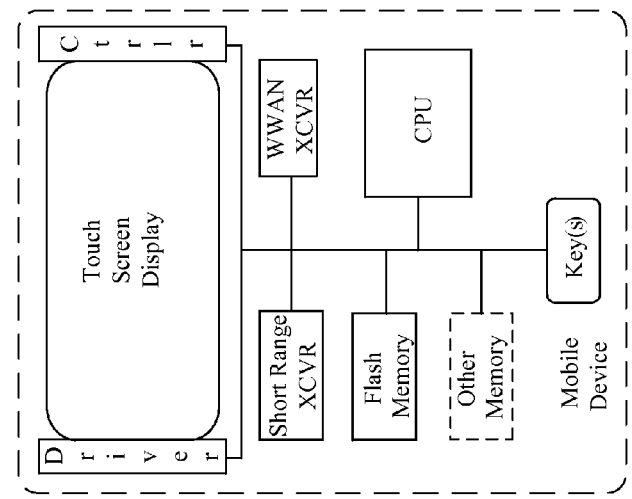
FIG. 14 is a simplified functional block diagram of a mobile device, as an alternate example of a user terminal device, for possible communication in or with the system of FIG. 7A.
Figure 13:
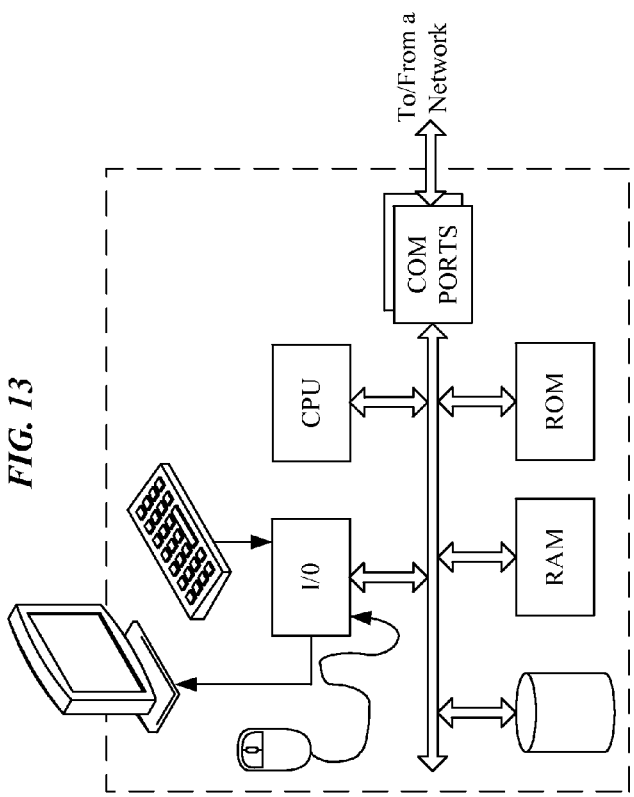
FIG. 13 is a simplified functional block diagram of a personal computer or other user terminal device, which may be used as the remote access terminal, in the system of FIG. 7A.
Figure 12:
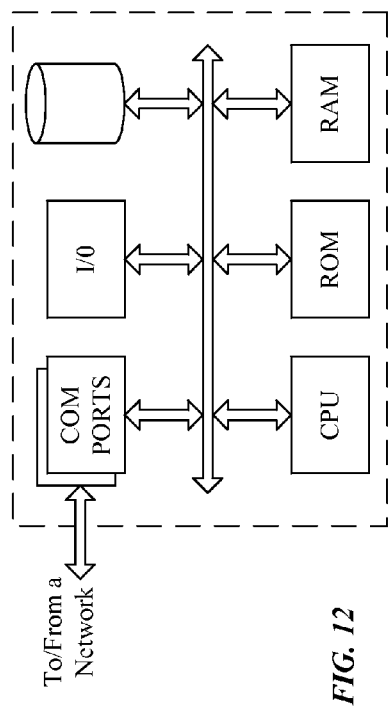
FIG. 12 is a is a simplified functional block diagram of a computer that may be configured as a host or server, for example, to function as the external server or a server if provided at the premises in the system of FIG. 7A.

As shown by the above discussion, at least some functions of devices associated or in communication with the networked lighting system 10 of FIG. 7A, such as elements shown at 27 and 29 (and/or similar equipment not shown but located at the premises 21), may be implemented with general purpose computers or other general purpose user terminal devices, although special purpose devices may be used. FIGS. 12-14 provide functional block diagram illustrations of exemplary general purpose hardware platforms.

FIG. 12 illustrates a network or host computer platform, as may typically be used to implement a host or server, such the computer 27. FIG. 13 depicts a computer with user interface elements, as may be used to implement a personal computer or other type of work station or terminal device, such as the terminal 29 in FIG. 7A, although the computer of FIG. 13 may also act as a server if appropriately programmed. The block diagram of a hardware platform of FIG. 14 represents an example of a mobile device, such as a tablet computer, smartphone or the like with a network interface to a wireless link, which may alternatively serve as a user terminal device like 29. It is believed that those skilled in the art are familiar with the structure, programming and general operation of such computer equipment and as a result the drawings should be self-explanatory.

A server (see e.g. FIG. 12), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Also, a computer configured as a server with respect to one layer or function may be configured as a client of a server in a different layer and/or for a different function. In a similar fashion, a central function or service 57A, 57B implemented as a server functionality on one or more lighting devices 11 with respect to client programming/functionality of other intelligent system elements at premises 21 may itself appear as a client with respect to a server in a different layer and/or for a different function such as with respect to a server 27.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 13). A mobile device (see FIG. 14) type user terminal may include similar elements, but will typically use smaller components that also require less power, to facilitate implementation in a portable form factor. The example of FIG. 14 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 12 and the terminal computer platform of FIG. 13 are shown by way of example as using a RAM type main memory and a hard disk drive for mass storage of data and programming, whereas the mobile device of FIG. 14 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 13). The mobile device example in FIG. 14 touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 12-14 in their present form show computers and user terminal devices, generally similar configurations also may be used within other elements of the lighting system 10. For example, one implementation of the brain, communication and interface elements of a lighting device may utilize an architecture similar to that of one of the computers or mobile terminals. As a more specific example, the personal computer type hardware in FIG. 13 (except for the keyboard, mouse and display) could serve as the brain and communication elements of a lighting device, where the input/output interface I/O would interface to an appropriate light driver and to any sensor(s) or other enhancement input or output device(s) included within the lighting device.

If provided on the system 10, additional system elements, such as a standalone sensor or an additional user interface device, they may be similarly implemented using an architecture like one of the devices of FIGS. 12-14. For example, an additional other user interface device (UI) might utilize an arrangement similar to the mobile device of FIG. 14, albeit possibly with only one transceiver compatible with the networking technology of the particular premises (e.g. to reduce costs).

As also outlined above, aspects of the interactive user interface and any associated control and/or learning techniques of the lighting devices 11 may be embodied in programming of the appropriate system elements, particularly for the processors of intelligent lighting devices 11. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider (e.g. implemented like the server computer shown at 27) into any of the lighting devices, etc. of or coupled to the system 10 at the premises 21, including programming for individual element functions, programming for user interface functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device, comprising:
   a processor;
   a source of light, the source of light being configured to output visible light for general illumination in a manner permitting control of a plurality of parameters of the visible light output, responsive to control by the processor;
   an image sensor configured to capture images;
   a data communication interface, controlled by the processor, configured for communication of data from and to the lighting device over a network;
   a microphone accessible to the processor and configured to detect audio user input activity;
   a storage device accessible by the processor; and
   a program in the storage device, wherein execution of the program by the processor configures the lighting device to implement functions, including functions to:
      identify the occupant by:
         detecting, based on occupancy sensed by the image sensor or the microphone, that an individual has entered the space serviced by the lighting device; and
         biometrically identifying that the individual is a particular identified occupant from the captured images from the image sensor by: (i) applying facial recognition, (ii) determining relative dimensions of the individual in comparison to one or more objects in the space, or (iii) recognizing gestures from the individual;
      retrieve a profile of the identified occupant, the profile including a lighting control function established for the identified occupant;
      operate the light source to illuminate the space while the identified occupant is in the space, including control of at least one of the plurality of parameters of the visible light output in accordance with the lighting control function established for the identified occupant;
      access, via communication over the network, information about the identified occupant from an on-line social media service;
      responsive to the accessed information about the identified occupant, determine a social media status of the identified occupant;
      detect a condition in a space illuminated by the lighting device based on the captured images, the condition relating to an activity of an occupant when within the space;
      process the condition responsive input from the captured images to determine an activity status that recognizes a task being performed by the identified occupant while in the space;
      detect via voice recognition a current mood status of the identified occupant from the audio user input activity of the microphone;
      in response to: (i) determining the social media status, (ii) determining the activity status that recognizes the task being performed by the identified occupant while in the space, and (iii) detecting the mood status of the identified occupant from the audio user input activity, adjust at least one of the plurality of parameters of the visible light output of the lighting control function included in the profile, the adjustment resulting in an adjusted lighting control function; and further operate the light source to illuminate the space in accordance with the adjusted lighting control function.

2. The lighting device of claim 1, wherein:

lighting device is further configured to control an environmental condition other than light in the space;

the retrieved profile includes a control function established for the identified occupant with respect to the environmental condition; and execution of the program by the processor configures the lighting device to implement further functions, including functions to:

control of the environmental condition in accordance with the environmental control function established for the identified occupant; and based on at least one of the determined statuses of the identified occupant, adjust the control of the environmental condition.

3. The lighting device of claim 1, further comprising a learning module configured to implement the function to adjust the lighting control function based upon previously determined statuses in response to previous light source operation or control adjustment.

4. The lighting device of claim 3, wherein:

the learning module comprises a neural network;

the neural network receives the currently determined statuses and the previously determined social media status, activity status, and mood status as input;

the neural network produces a weight corresponding to each of the currently determined statuses based on the previously determined statuses; and the function to adjust the lighting control function is based on at least one of the currently determined statuses and corresponding weight.

5. A lighting device, comprising:

a processor;

a source of light, the source of light being configured to output visible light for general illumination in a manner permitting control of a plurality of parameters of the visible light output, responsive to control by the processor;

a camera configured to capture images;

an occupancy sensor accessible to the processor and configured to detect that an individual has entered the space serviced by the lighting device;

a data communication interface, controlled by the processor, configured for communication of data from and to the lighting device over a network;

a microphone accessible to the processor and configured to detect audio user input activity;

a storage device accessible by the processor; and a program in the storage device, wherein execution of the program by the processor configures the lighting device to implement functions, including functions to:

identify at least one of the plurality of respective occupants by:

detecting, based on occupancy sensed by the occupancy sensor, the camera, or the microphone, that the individual has entered the space serviced by the lighting device; and biometrically identifying that the individual is a particular identified occupant from the captured images from the camera by: (i) applying facial recognition, (ii) determining relative dimensions of the individual in comparison to one or more objects in the space, or (iii) recognizing gestures from the individual;

for each respective identified occupant:

retrieve a profile of the respective identified occupant, the profile including a lighting control function established for the respective identified occupant;

determine a control setting for at least one of the plurality of parameters of the visible light output from the lighting control function established for the respective identified occupant;

access, via communication over the network, information about the respective identified occupant from an on-line social media service;

responsive to the accessed information about the respective identified occupant, determine a social media status of the respective identified occupant;

detect a condition in a space illuminated by the lighting device based on the captured images, the condition relating to an activity of an occupant when within the space;

process the condition responsive input from the captured images from the camera to determine an activity status that recognizes a task being performed by the respective identified occupant while in the space;

detect via voice recognition a current mood status of the identified occupant from the audio user input activity of the microphone; and in response to: (i) determining the social media status, (ii) determining the activity status that recognizes the task being performed by the identified occupant while in the space, and (iii) detecting the mood status of the respective identified occupant from the audio user input activity, adjust the control setting, the adjustment resulting in an adjusted lighting control function for the respective identified occupant; and operate the light source to illuminate the space for general illumination in accordance with a composite lighting control function, the composite lighting control function based on a contribution from each respective identified occupant's adjusted lighting control function.

6. The lighting device of claim 5, wherein the function to adjust the control setting for each identified occupant comprises a function to modify the lighting control function established for the respective identified occupant based on a combination of the determined social media status, activity status, and mood status for the respective identified occupant.

7. The lighting device of claim 5, further wherein:

each retrieved profile includes a respective weight; and each respective identified occupant's contribution to the composite lighting control function is based on the respective weight.

8. The lighting device of claim 7, wherein the retrieved profile with the greatest corresponding weight controls the composite lighting control function.

9. The lighting device of claim 7, wherein the contribution of each respective identified occupant is further based on a weighted utility function for each respective identified occupant and the maximization or minimization of a composite utility function including the weighted utility function for each respective identified occupant.

10. The lighting device of claim 5, wherein further execution of the program by the processor further configures the lighting device to implement further functions, including functions to:

for any unidentified occupant, retrieve a default profile, the default profile including a default lighting control function;

determine a control setting for at least one of the plurality of parameters of the visible light output in accordance with the default lighting control function;

process the condition responsive signal from the sensor to determine an activity status of any unidentified occupant while in the space;

based on the activity status of any unidentified occupant, adjust the control setting of the at least one of the plurality of parameters of the visible light output in accordance with the default lighting control function; and operate the light source and adjust the control of the at least one of the plurality of parameters of the visible light output based on each unidentified occupant's contribution to the composite operation of the light source and the composite adjustment to the control setting of the at least one of the plurality of parameters of the visible light output in accordance with the composite lighting control function.

11. The lighting device of claim 5, further comprising a learning module configured to, based on previously determined statuses, previous operations, previous adjustments and previous contributions, influence the contribution of each identified occupant to the composite lighting control function.

* * * * *